Figure 4:
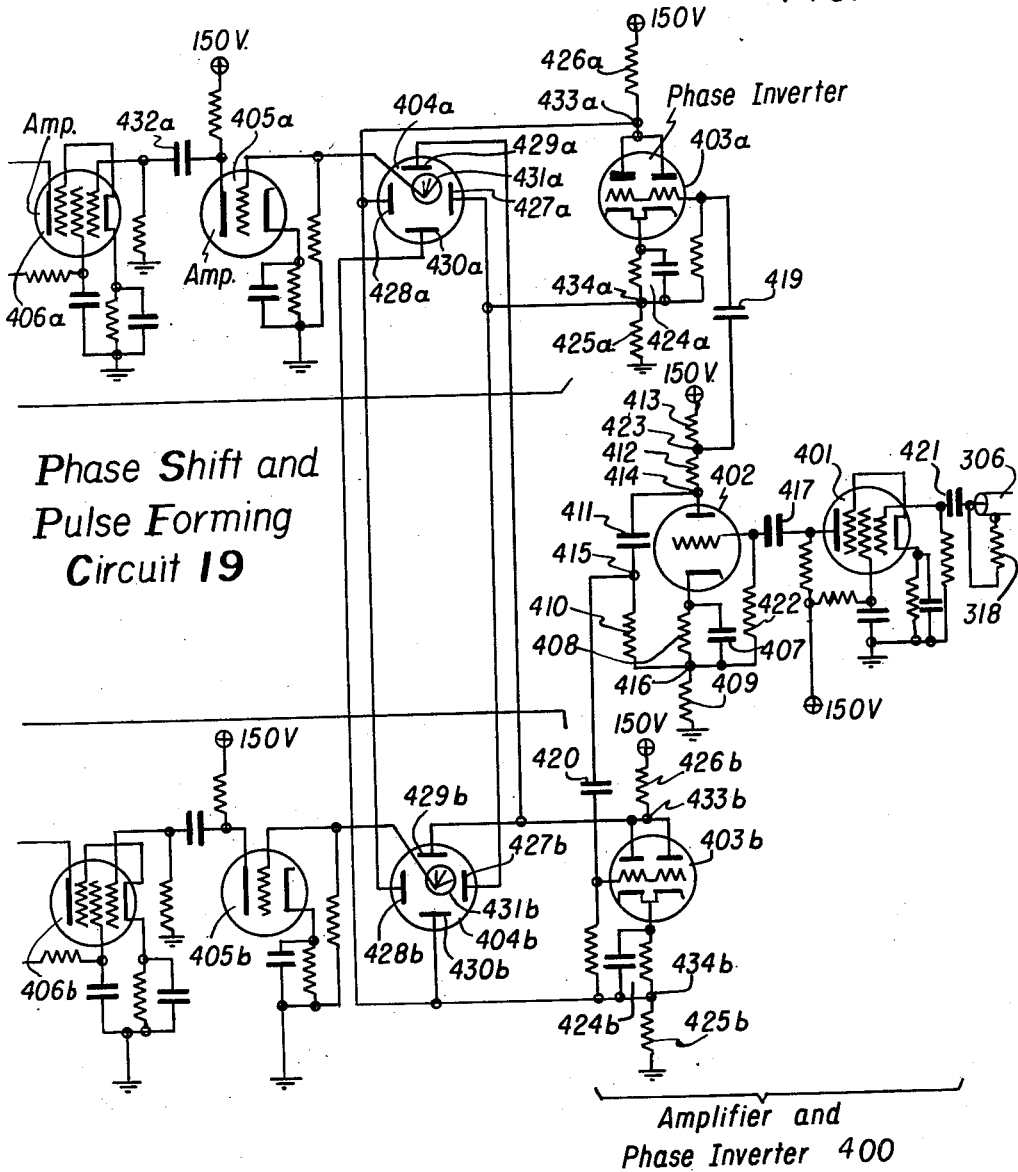

Oct. 30, 1956 R. B. TROUSDALE 2,769,085
PULSE GENERATING APPARATUS
Filed Dec. 26, 1951 13 Sheets-Sheet 1
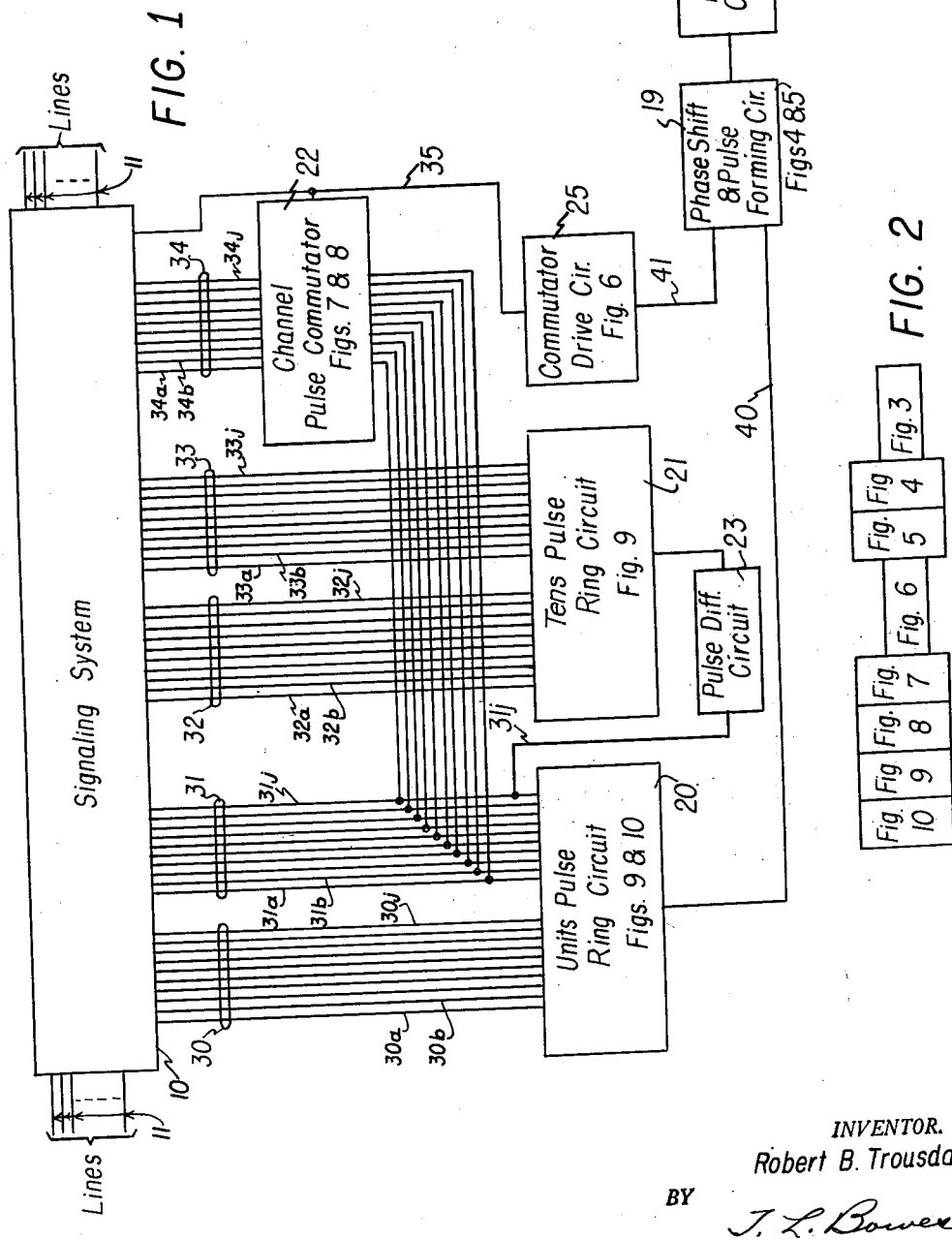
INVENTOR.
Robert B. Trousdale
BY
J. L. Bower
Attys.

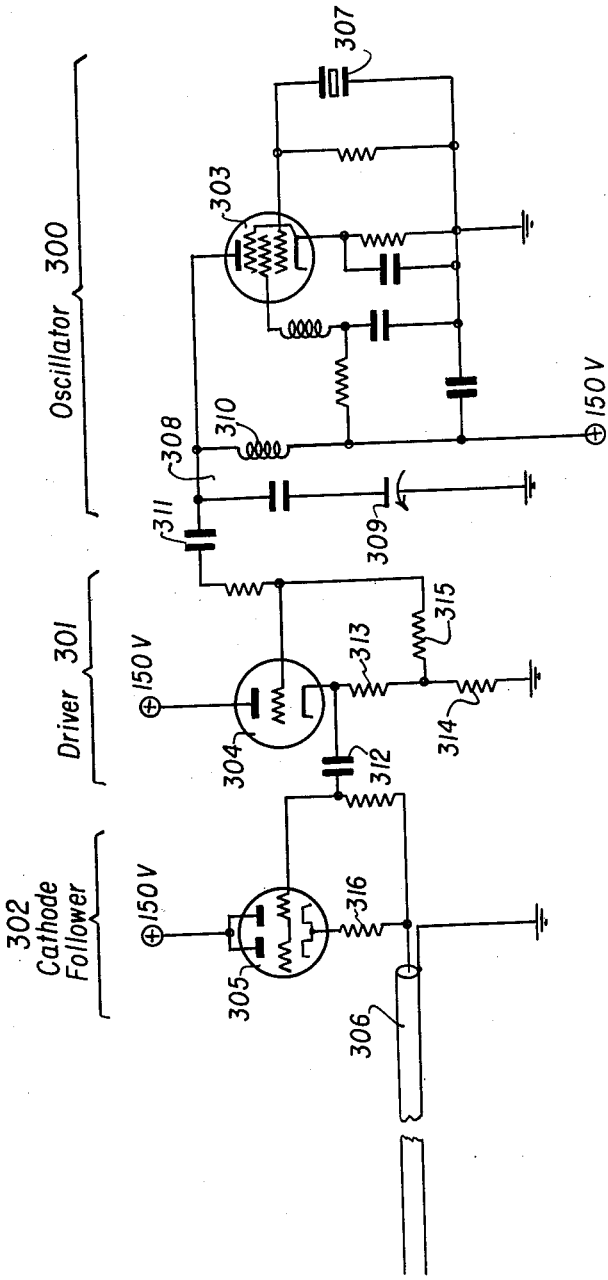

INVENTOR.
Robert B. Trousdale

FIG. 5
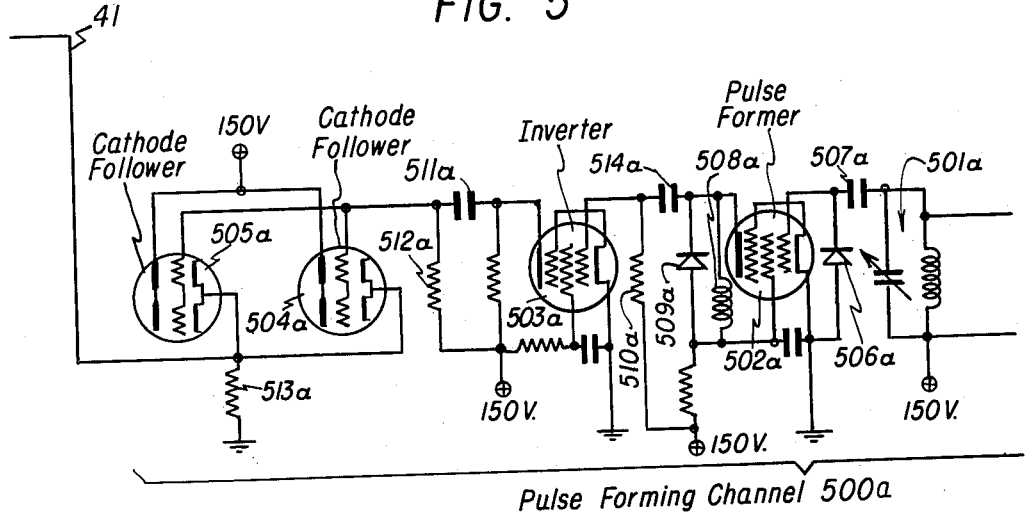
Phase Shift and Pulse Forming Circuit 19
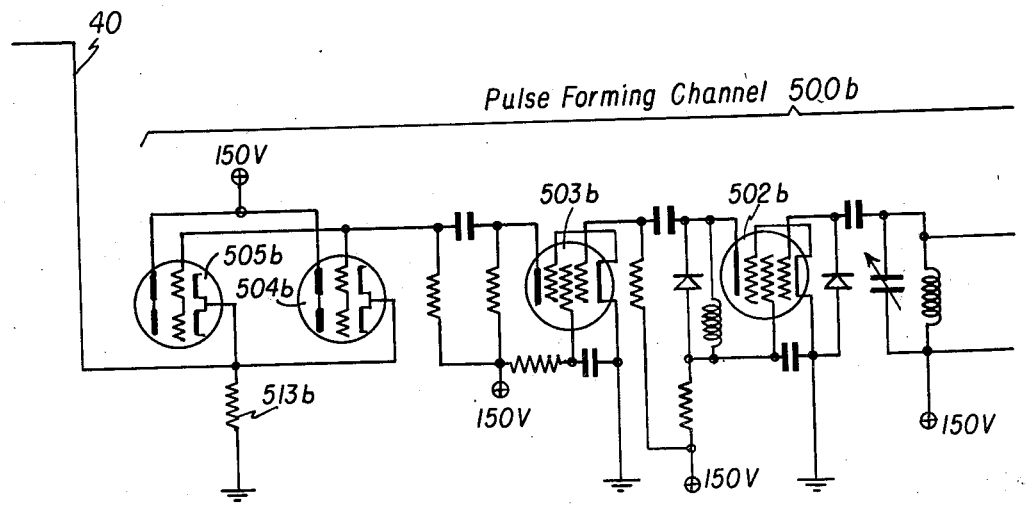
INVENTOR.
Robert B. Trousdale Channel Pulse Commutator 22

Oct. 30, 1956 R. B. TROUSDALE 2,769,085
PULSE GENERATING APPARATUS
Filed Dec. 26, 1951 13 Sheets-Sheet 13

INVENTOR.
Robert B. Trousdale
BY
*J. L. Bowes*
Attys.

United States Patent Office 2,769,08[5]
Patented Oct. 30, 195[6]

2,769,085

PULSE GENERATING APPARATUS

Robert B. Trousdale, Rochester, N. Y., assignor, by mesne assignments, to General Dynamics Corporation, a corporation of Delaware Application December 26, 1951, Serial No. 263,264

17 Claims. (Cl. 250—27)

The present invention relates to pulse generating apparatus and more particularly to pulse generating apparatus for controlling the signal channel separating components of a signaling system of the time sharing type. This application is a continuation-in-part of applicant's copending application Serial No. 186,046, filed September 21, 1950, and assigned to the same assignee as the present application.

In signaling systems of the general character mentioned, common signal transmission channels are employed simultaneously to handle a plurality of signals, and signal separation is accomplished by pulse sampling of the different signals and the transmission of signal sample modulated pulses over the common signal transmission channels in different known time positions. To insure proper signal channel separation, it is usually necessary to provide two or more pulse generating sources which produce pulses of different widths and are carefully controlled to operate in synchronism. Synchronization of the pulse sources without employing elaborate synchronizing networks is rather difficult, particularly in a system of the improved form disclosed in the above-identified copending application, wherein narrow channel pulses, units pulses of greater width than the channel pulses and group pulses each spanning a number of units pulses must all be developed in synchronism and with predetermined time relationship therebetween.

It is an object of the present invention, therefore, to provide improved pulse generating apparatus.

It is another object of the invention to provide improved apparatus for generating two or more sets of pulses having different widths and for maintaining predetermined time or phase relationships between the pulses of the different pulse sets.

It is still another object of the present invention to provide improved apparatus for generating two or more sets of pulses having different widths for releasing the pulses of at least one of the pulse sets successively to different pulse channels on a repetitive or cyclic basis, and for maintaining predetermined time or phase relationships between the pulses of the different pulse sets.

In accordance with another object of the invention, synchronization of the pulses of the different pulse sets is in part obtained by employing the pulses of one pulse set to control the generation of the pulses of a second pulse set.

According to still another object of the invention, synchronization of the pulses of the different pulse sets is further obtained by deriving the pulses from which the different sets of pulses are developed from a common signal source.

It is a still further object of the invention to provide improved facilities for automatically restarting certain components of the pulse generating apparatus in the event such components stop operating.

Figure 6:
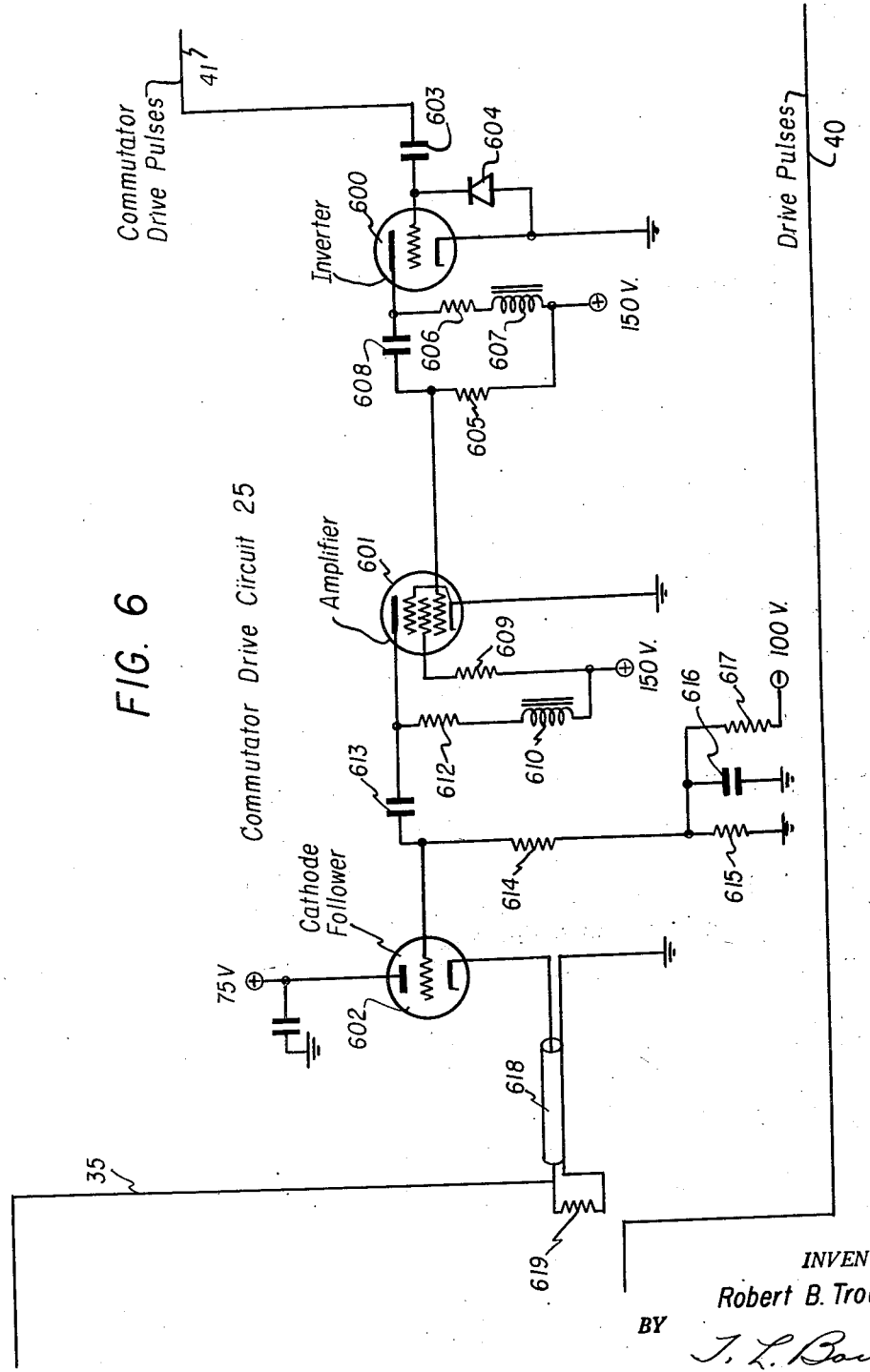
Figure 7:
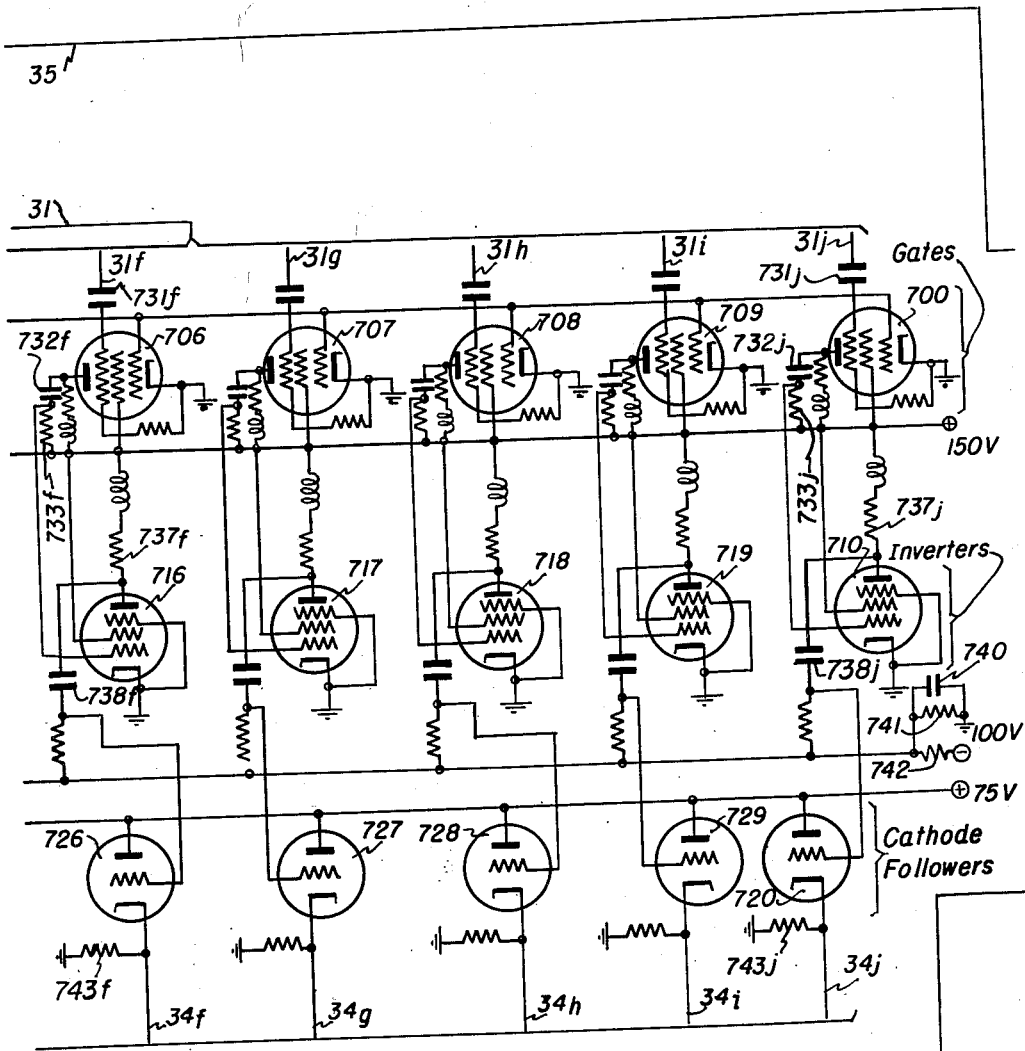
Figure 8:
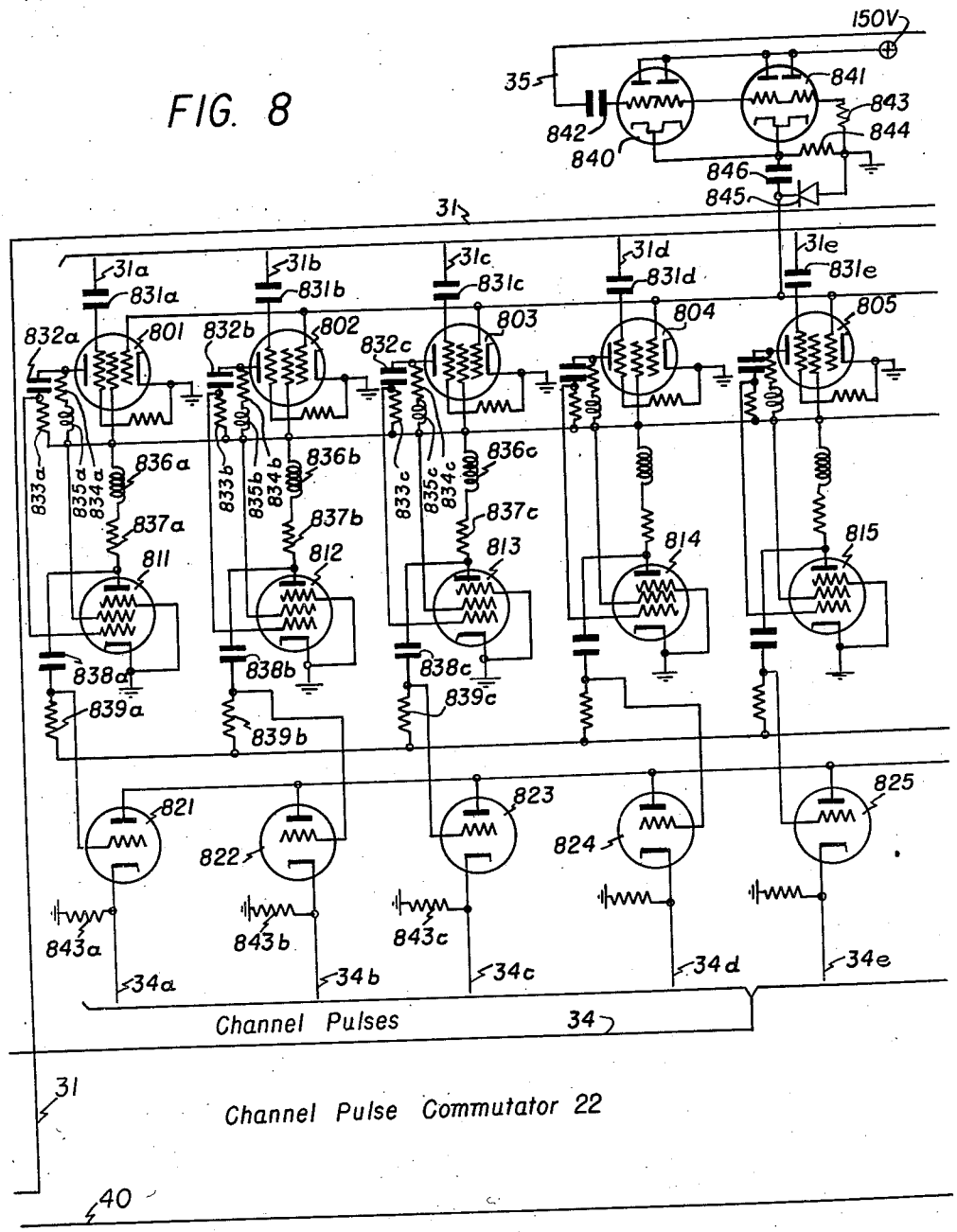
Figure 9:
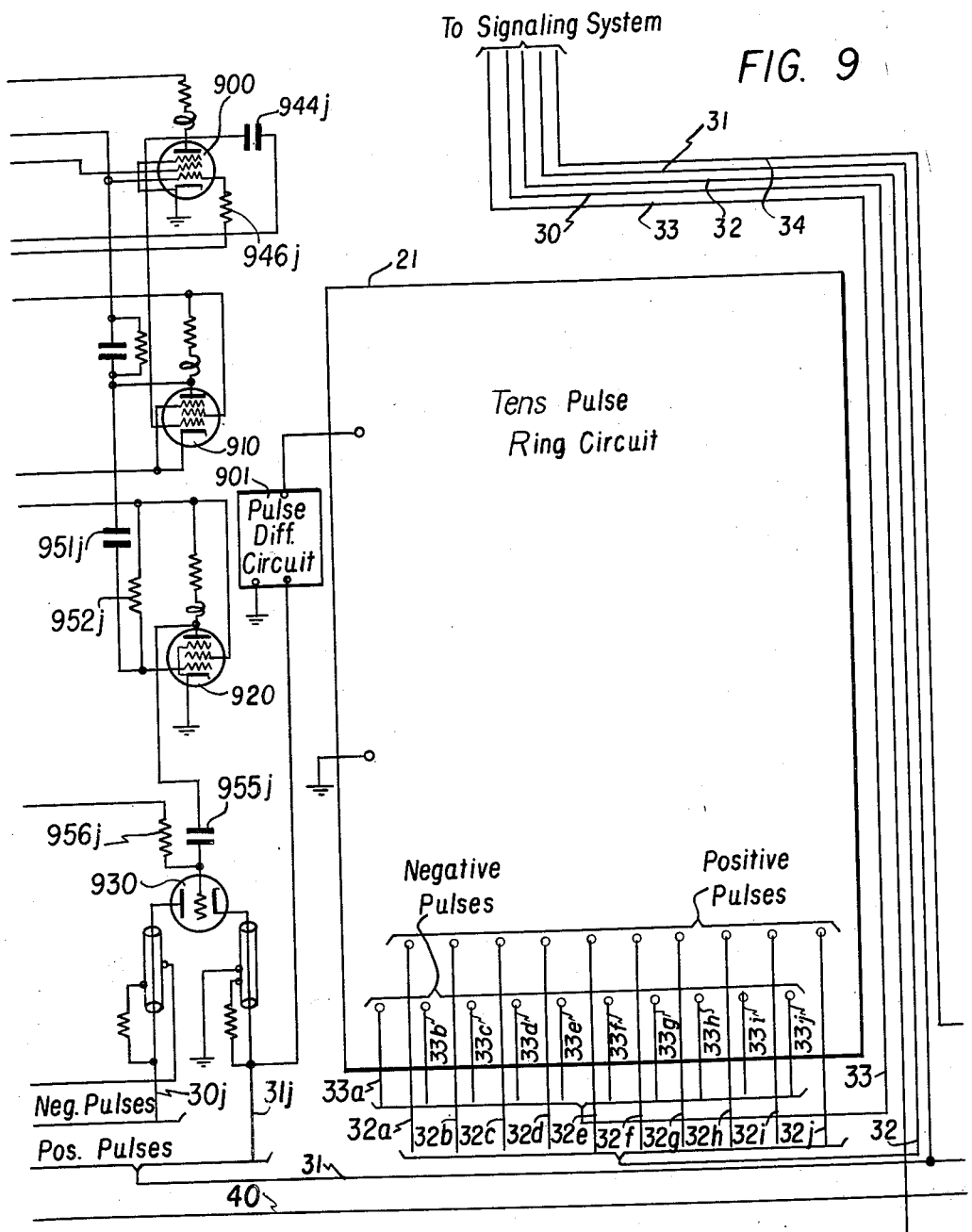
Figure 10:
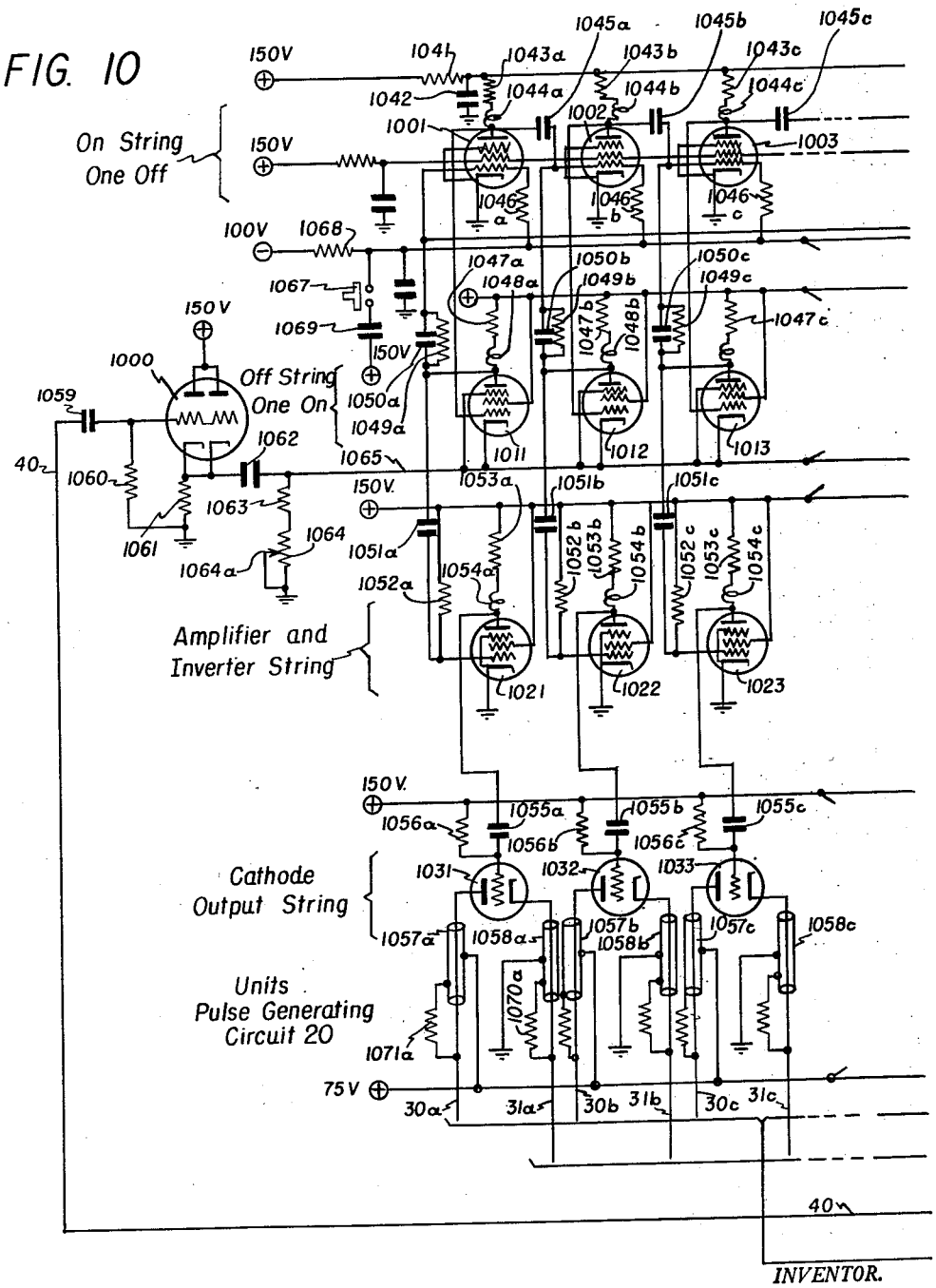
Figure 11:
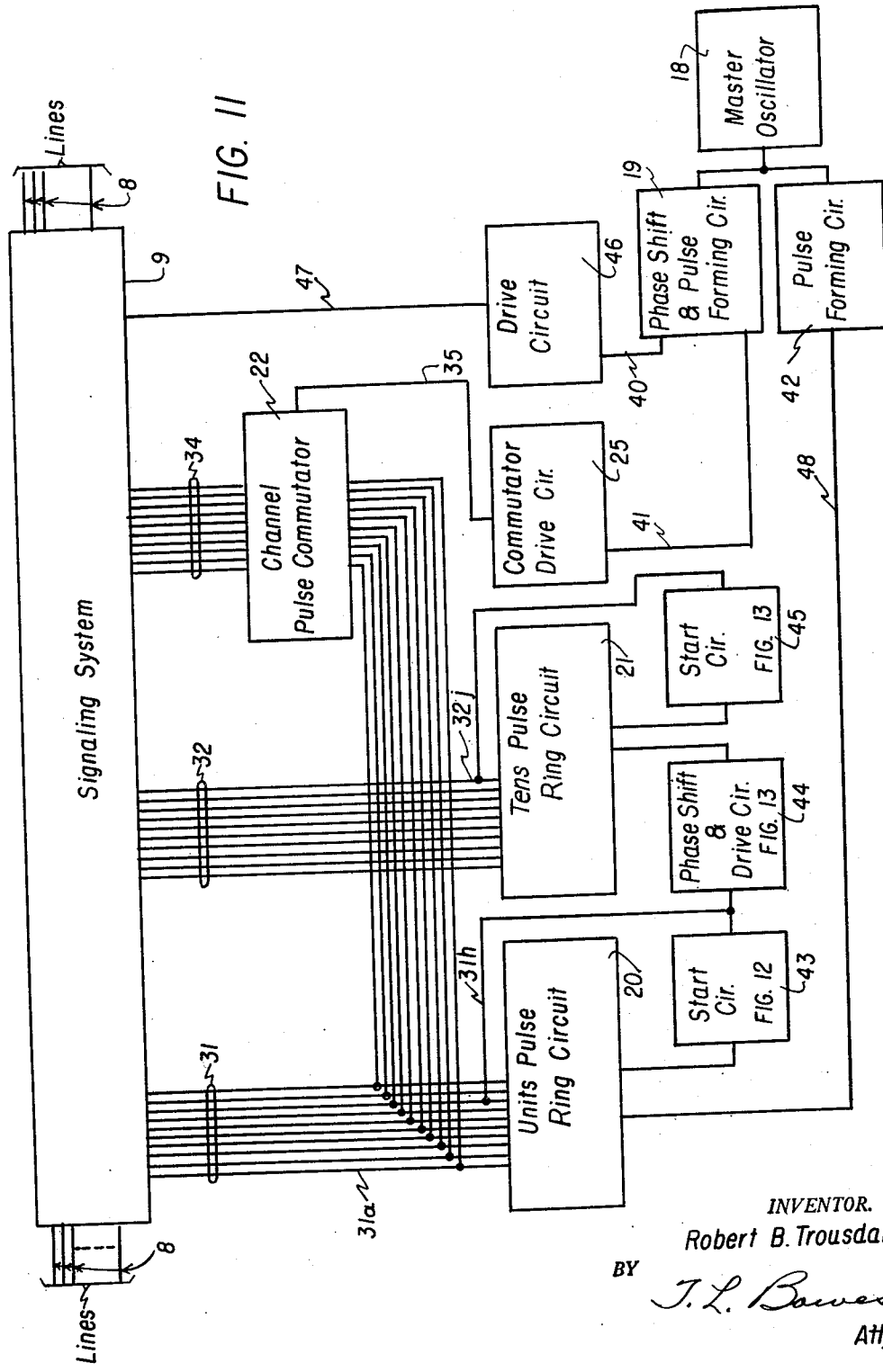
Figure 12:
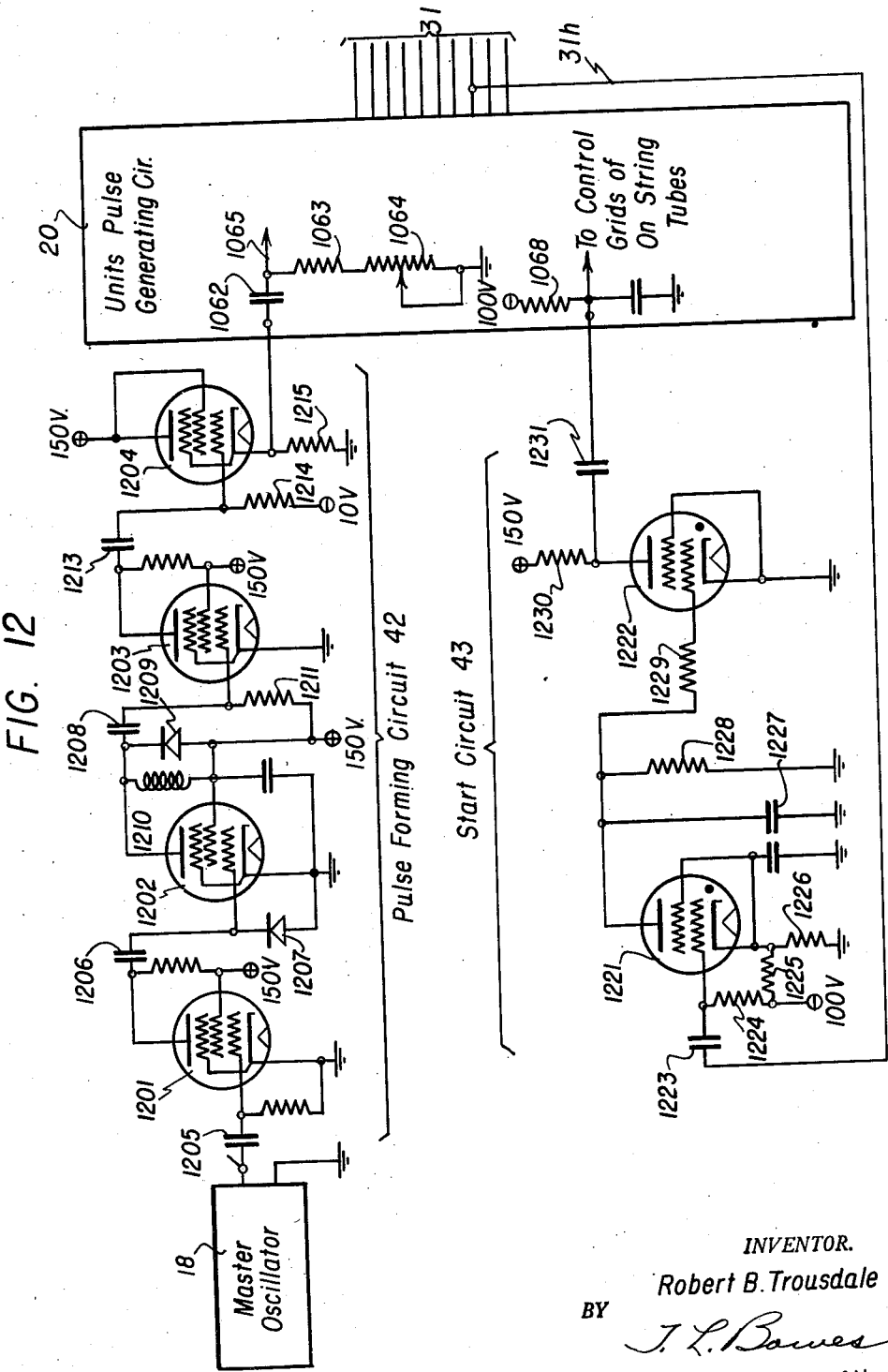
Figure 13:
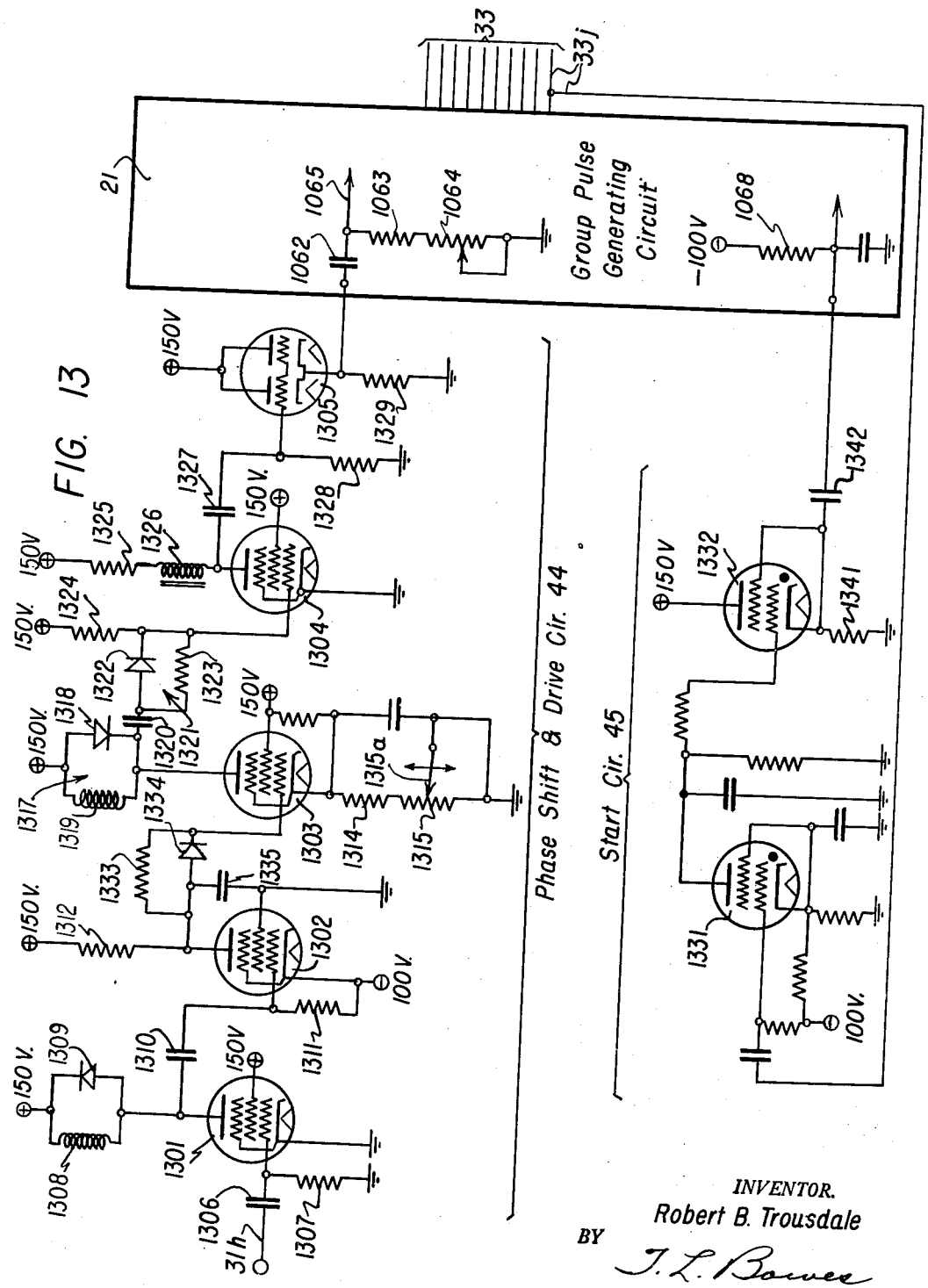
Figure 14:
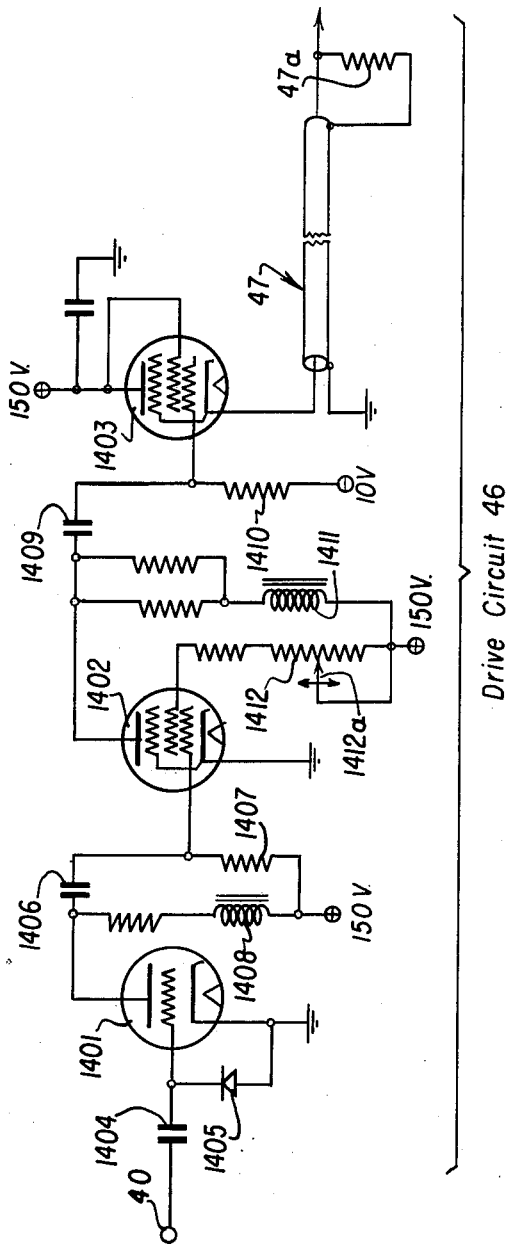

The invention, both as to its organization and method of operation, together with further objects and advantages thereof, will best be understood by reference to the following specification taken in connection with the accompanying drawings, in which:

Fig. 1 diagrammatically illustrates a signaling system embodying pulse generating apparatus characterized by the features of the present invention;

Fig. 2 illustrates the manner in which Figs. 4 to 10 inclusive, should be assembled to show the details of the present improved pulse generating apparatus;

Fig. 3 schematically illustrates the master oscillator embodied in the apparatus;

Figs. 4 and 5 schematically illustrate the phase shift and pulse forming circuit embodied in the apparatus;

Fig. 6 schematically illustrates the commutator drive circuit forming a part of the apparatus;

Figs. 7 and 8 schematically illustrate the channel pulse commutator forming a part of the apparatus;

Figs. 9 and 10 schematically illustrate the group and units pulse generating circuits embodied in the apparatus;

Fig. 11 diagrammatically illustrates a modified embodiment of the present improved pulse generating apparatus;

Fig. 12 schematically illustrates the pulse forming and start circuits embodied in the apparatus of Fig. 11;

Fig. 13 schematically illustrates the phase shift and drive circuit and another start circuit embodied in the apparatus shown in Fig. 11; and Fig. 14 schematically illustrates another of the drive circuits embodied in the apparatus shown in Fig. 11.

Referring now to the drawings and more particularly to Fig. 1 thereof, the present improved pulse generating apparatus is there illustrated in combination with a signaling system generally indicated at 10 which may be employed selectively to transmit signals between any pair of lines 11. This signaling system may be in the form of an automatic telephone system of the improved form disclosed and claimed in the above-identified copending application, and reference may be had to said application for a detailed description of the system. Briefly, however, a system of multiplexing, namely pulsed sampling effectively at an ultrasonic rate of the control and intelligence signals produced at each substation of the system, is utilized to provide signal channel separation. Specifically, each line or substation of the system is assigned a particular pulse time position in each of repetitive pulse frames each comprising one hundred pulse time positions. Intelligence and control signals developed at any one substation of the system are sampled only in the particular pulse time position assigned to the particular substation and the samples are carried through the signal transmitting linkage of the system as far as the connector stage on multiplexer signal pulses occurring in this particular time position. In the connector stage the control or intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. In order to minimize the amount of equipment used in the system, a decimal system of pulsing, employing group and unit pulses of the character hereinafter described, is used at each of the line or time position selecting stages of the system.

Generally considered, the present improved pulse generating apparatus comprises a master oscillator 18 designed to operate at a fixed radio frequency (preferably one megacycle) and having its output terminals connected to control a phase shifter and pulse former network 19. As controlled by the master oscillator 18, the phase shifter and pulse former network 19 functions continuously to develop two identical trains of shaped pulses having a common pulse frequency of one megaycle, which are transmitted over the channels 40 and 1, respectively, to a units pulse ring circuit 20 and a commutator drive circuit 25. The phase relationship between the pulses respectively produced in the channels 40 and 41 by the network 19 may be shifted as desired through adjustment of certain of the components of this network. As controlled by the phase shifter and pulse former network 19, the units pulse ring circuit 20 functions sequentially to develop the units pulses which define the different time positions of the time position frames, appear on the conductors within the cables 31 and 30, respectively, and are fed by way of these conductors to the various intelligence transmitting and control components of the system 10. More specifically, the cable 30 comprises ten units pulse conductors 30a, 30b—30j over which negative units pulses are sequentially transmitted in the order named to the system 10. In time coincidence with the described negative units pulses, the ring circuit 20 produces positive units pulses on the ten units pulse conductors 31a, 31b—31j forming the cable 31, which are transmitted to the system 10. The positive and negative units pulses are sequentially developed on the units leads 31 and 30, respectively, at a frequency rate of 100 kilocycles and each tenth positive units pulse, i. e., each pulse appearing on the units pulse conductor 31j, is transmitted through a pulse differentiating circuit 23 to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors 32a, 32b—32j forming the cable 32 and the negative tens pulses as produced by the ring circuit 21 in time coincidence with the positive tens pulses and as sequentially impressed on the tens pulse conductors 33a, 33b—33j forming the cable 33 are delivered to various line selecting stages of the system 10 in the manner indicated above. As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34a, 34b—34j forming the cable 34, which are fed to certain of the units pulse gate circuits embodied in the system 10. These channel pulses occur at the same frequency as the units pulses, but are much narrower in width. For example, the channel pulses appearing on the conductor 34a are much narrower than the units pulses appearing on the positive units pulse lead 31a and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to certain of the out gate circuits embodied in the system 10.

Throughout the following detailed description of the present improved pulse generating apparatus, the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular component of the apparatus, those circuit elements which perform entirely conventional functions in the circuits, namely functions which will be readily understood by those skilled in the art, have not been identified in the drawings or referred to in the following description of the apparatus.

Master oscillator 18

This circuit, as shown in Fig. 3 of the drawings, is substantially conventional and is designed to provide a stable output signal voltage of three volts at a frequency of one megacycle across the output terminals thereof. In general, the circuit comprises an oscillator section 300 which includes an oscillator tube 303 of the well known 6AK5 type, a driver section 301 which includes a triode of the 6C4 type, and a cathode follower section 302 which includes a twin triode tube of the well known 6J6 type. More specifically, the oscillator section 300 of the circuit 18 is of the electron coupled type in which the screen electrode of the tube 303 serves as the plate or anode of a triode oscillator and power is taken from a tuned output circuit coupled between the anode and cathode of the tube 303. It is provided with a frequency determining crystal 307 having a resonant frequency of one megacycle which is connected between the input electrodes of the tube 303 to determine the output frequency of the oscillator, and a tuned output circuit, consisting of an inductance 310 paralleled by a tuning condenser 309, designed to have a resonant frequency of one megacycle. The output voltage developed by the oscillator network 300 is impressed upon the input electrodes of the driver tube 304 through a coupling condenser 311. The driver tube 304 is connected to operate as a cathode follower, resistors 313 and 314 being provided in the cathode circuit of this tube across which the one megacycle signal voltage is developed. The direct current component of the voltage appearing across the resistor 313 is applied through a resistor 315 negatively to the control grid of the tube 304 to establish the normal operating bias level for this tube. The signal voltage appearing across the serially related cathode resistors 313 and 314 of the driver tube 304 is impressed upon the parallel connected control grids of the cathode follower tube 305 through a coupling condenser 312. As shown, the parallel connected cathodes of the tube 305 are connected to ground through a load circuit which comprises a cathode resistor 316, a coaxial cable 306 extending to the phase shift and pulse forming circuit 19 and a terminating resistor 318 provided at the distant end of the cable 306. More specifically, the terminating resistor 318 is connected between the central conductor of the coaxial cable 306 and the grounded sheath of this cable.

As will be evident from the foregoing explanation, the output voltage developed across the output circuit 308 during operation of the oscillator network 300 is impressed upon the control grid of the driver tube 304 through the coupling condenser 311. This signal voltage is repeated by the tube 304 and appears across the cathode resistors 313 and 314 to be conducted to the control grids of the twin triode tube 305 through the coupling condenser 312. In the cathode follower 302, the signal voltage is repeated by the tube 305 and appears across the cathode load circuit of this tube, namely, the resistors 316 and 318 and the coaxial cable 306. That portion of this voltage which is developed across the resistor 318 is utilized as the driving voltage for the phase shift and pulse forming circuit 19. This voltage has substantilly a pure sine wave form and an amplitude of three volts. In the described operations, the driver section 301 of the oscillator 18 functions to match the relatively high impedance of the oscillator output circuit 308 with the relatively low input circuit impedance of the cathode follower 302, in addition to supplying a portion of the required attenuation of the oscillator output voltage.

Phase shift and pulse forming circuit 19

This circuit, as shown in Figs. 4 and 5 of the drawings, is provided to generate the extremely narrow pulses which are used in sampling the intelligence and control signals developed on the lines 11 of the system in the manner generally explained above, and also for driving the units pulse ring circuit 20 and the commutator drive circuit 25. It is arranged to operate from a sine wave signal source, namely, the master oscillator 18, and responds to the sine wave signal delivered thereto from the master oscillator 18 by developing two sets of output pulses on the output conductors 40 and 41 which may be phase shifted with respect to each other over a full 360 degree phase shift range. This permits exact centering of the signal sampling pulses within the limits of corresponding units pulses of longer duration in the manner generally explained above.

Briefly considered, the circuit 19 comprises an amplifier and phase inverter section 400 which is common to two identical pulse forming channels 500a and 500b. These two pulse forming channels comprise identical circuit components interconnected in the same way. Accordingly, reference numerals, distinguished by the subscripts a and b, have been employed to identify corresponding components of the two channels. In detail, the amplifier and phase splitting section 400 comprises a high gain pentode amplifier tube 401 of the 6AK5 type having its input electrodes coupled to the output resistor 318 of the master oscillator 18 through a coupling condenser 421 and having its output electrodes coupled through a coupling condenser 412 to the input electrodes of a phase splitting tube 402 of the 6C4 type. The tube 402 is provided wtih a cathode load resistor 409 connected in series with a cathode bias resistor 408 which is shunted by a by-pass condenser 407. The direct current component of the voltage developed across the resistor 408 is negatively applied as a bias voltage to the control grid of the tube 402 through a resistor 422. This tube is also provided with an anode load circuit which comprises two series connected resistors 412 and 413 having a combined resistance somewhat higher than the resistance of the cathode load resistor 409. A phase splitting circuit comprising a condenser 411 and resistor 410 connected in series between the anode of the tube 402 and the top of the load resistor 409 is provided to perform the phase splitting operation described more fully below. The phase splitting tube 402 is coupled through coupling condensers 419 and 420, respectively, to excite the input electrodes of two phase inverter-tubes 403a and 403b. Each of the tubes 403a and 403b is of the twin triode 6J6 type having its anodes, control grids and controls connected in parallel. As shown, the tube 403a is provided with a self-biasing network 424a, a cathode load resistor 425a and an anode load resistor 426a. Similarly, the phase inverter tube 403b is provided with a self-biasing circuit 424b, a cathode load resistor 425b, and an anode load resistor 426b. Each of the two phase inverter tubes delivers two phase displaced input signals to each of the two pulse forming channels 500a and 500b.

Considering the pulse forming channel 500a by way of example, this channel comprises a four phase condenser 404a having four stator plates 427a, 428a, 429a and 430a which are physically displaced by 90 degrees and within which is rotatably mounted a specially shaped rotor 431a capable of rotation through an angle of 360 degrees or more. The stator plates 427a and 428a are respectively connected to the top terminal 434a of the cathode load resistor 425a and the anode terminal 433a of the tube 403a, whereas the two remaining stator plates 429a and and 430a are respectively connected to the anode terminal 433b of the phase inverter tube 403b and the top terminal 434b of the cathode load resistor 425b. The signal voltage developed between the rotor 431a of the four-phase condenser 404a and ground is impressed upon the input electrodes of a triode amplifier tube 405a of the well known 6C4 type. This amplifier tube feeds its amplified signal output voltage through a coupling condenser 432a to the input electrodes of a second high gain pentode amplifier tube 406a of the well known 6AK5 type. The output circuit 501a of the last-mentioned amplifier tube consists of inductance and capacitance elements which are shunt connected to form a tuned circuit resonant at the signal frequency of one megacycle. The voltage developed across this resonant circuit is impressed upon the input electrodes of a pulse forming tube 502a through a coupling condenser 507a. This tube is also of the commercial 6AK5 type and has its input electrodes shunted by a crystal rectifier 506a. The output circuit of the pulse forming tube 502a includes an inductance element 508a which is self-resonant at a frequency approximately 2½ times the output frequency of the master oscillator 18, i. e., at a frequency of approximately 2½ megacycles. This self-resonating inductance element is shunted by a crystal rectifier 509a. The voltage developed across the shunt connected elements 508a and 509a is impressed upon the input electrodes of an inverter tube 503a through a coupling condenser 514a. This inverter tube is preferably in the form of a 6AK5 pentode and includes as one of its input electrodes a control grid which is connected to the +B terminal of the anode current supply source through a grid resistor 510a. The signal voltage developed at the anode of the tube 503a is fed through a coupling condenser 511a to the control grids of two parallel connected cathode follower tubes 504a and 505a having a common cathode load resistor 513a. These two cathode follower tubes are of the twin triode 6J6 type having their anodes, control grids and cathodes respectively connected in parallel. The cathode load resistor 513a of the two cathode follower tubes 504a and 505a functions as the output load impedance of the pulse forming channel 500a. Accordingly, the commutator drive conductor 41 is connected to the cathode end of this load resistor.

In considering the operation of the phase shift and pulse forming circuit 19, it will be understood that the one megacycle sine wave signal voltage developed across the output load resistor 318 of the master oscillator 18 is impressed between the cathode and control grid of the amplifier tube 401 through the coupling condenser 421. This voltage is amplified through the tube 401 and impressed between the control grid and cathode of the phase splitting tube 402 through the coupling condenser 417. The tube 402 is characterized by a low mu factor and performs the function of developing two sine wave voltages at the circuit terminals 415 and 423 which are displaced in phase by 90 degrees. More specifically, the signal voltage developed at the terminal 414 of the anode circuit is displaced in phase by one hundred and eighty degrees relative to the signal voltage developed at the cathode resistor load terminal 416. These two voltages are of substantially equal amplitude and are fed to the phase splitting circuit consisting of the condenser 411 and the resistor 410. As a result of the phase splitting action of these two series connected circuit elements, a resultant voltage is developed at the terminal 415 and impressed upon the control grids of the inverter tube 403b through the condenser 420 which is phase displaced by 90 degrees relative to the signal voltage appearing at either of the two anode circuit terminals 414 or 423. The phase inverter tube 403b responds to the excitation voltage thus impressed upon its control grid by developing signal voltages of equal amplitude at its anode circuit terminal 433b and cathode load resistor terminal 434b which are phase displaced by 180 degrees. These voltages are respectively impressed upon the stator plates 429a and 430a of the four-phase condenser 404a. Similarly, the signal voltages developed at the terminal points 433b and 434b of the phase inverter stage 403b are respectively impressed upon the stator plates 429b and 430b of the four-phase condenser 404b.

As indicated above, the signal voltage developed at the anode circuit terminal point 423 of the phase splitting stage 402 is phase displaced 90 degrees relative to the signal voltage developed at the circuit terminal 415. The voltage appearing at the terminal point 423 is impressed upon the input electrodes of the second phase inverter tube 403a through the coupling condenser 419 to produce signal voltages at the anode terminal point 433a and the cathode load resistor terminal 434a which are of equal amplitude but are phase displaced by one hundred and eighty degrees. These signal voltages are respectively impressed upon the stator plates 428a and 427a of the four-phase condenser 404a and upon the corresponding stator plates 428b and 427b of the second four-phase condenser 404b.

From the preceding explanation, it will be understood that the three tubes 402, 403a and 403b in cooperation with the circuit elements interconnected therewith respond to the amplified one megacycle signal voltage delivered to the tube 402 by producing four sine wave signal voltages of the same frequency and equal amplitude which are respectively displaced in phase by 90 degrees and which are respectively impressed upon the four stator plates of each of the four-phase condensers 404a and 404b. It is of importance to maintain amplitude equality between these signal voltages, and it is to this end that the combined plate or anode load resistance afforded by the resistors 412 and 413 in the anode circuit of the phase splitting tube 402 is made substantially greater than the resistance of the cathode load resistor 409. In this connection, it is noted that since the input electrode biasing resistor 408 of the tube 402 is by-passed at the signal frequency by the condenser 407, it does not substantially affect the cathode load resistance of the tube 402 at this frequency. The necessity for making the anode load resistance of the tube 402 appreciably higher than the cathode load resistance of the tube is dictated by the fact that the cathode impedance of the tube is very low and is virtually unaffected by stray capacitance, whereas the plate impedance of the tube is relatively high and hence the magnitude of the signal voltages appearing at the circuit terminals 414 and 423 is very substantially affected by the shunting effect of stray capacitance. However, by employing a load resistance for the tube 402 having a value appreciably higher than the resistance value of the cathode load resistor 409, this effect is overcome with the result that the voltages produced at the circuit terminals 414 and 416 are equalized. It has been found that entirely satisfactory results may be obtained by employing resistors 412 and 413 having resistance values of 2700 and 2400 ohms, respectively, and using a cathode load resistor 409 having a resistance value of 3900 ohms. Resistance values higher than those just given cannot be employed satisfactorily since the use of higher value resistors has the effect of altering to an appreciable extent the desired one hundred and eighty degree phase relationship between the signal voltages developed at the circuit terminals 414 and 416. Further to the end of obtaining amplitude equality between the signal voltages supplied to the four stator plates of each of the condensers 404a and 404b, the anode and cathode load resistors 426a and 425a of the tube 403a are selected to have relatively low and unequal resistance values, such that the voltages appearing at the circuit terminals 433a and 434a are of equal amplitude. Similarly, the anode and cathode load resistors 426b and 425b of the inverter tube 403b are selected to have unequal resistance values which insure amplitude equality of the signal voltages developed at the circuit terminals 433b and 434b. Specifically, the desired signal voltage equality at the output terminals of the two phase inverter tubes 403a and 403b may be obtained by using anode load resistors 426a and 426b each having a resistance value of 560 ohms and by using cathode load resistors 425a and 425b each having a resistance value of 470 ohms.

As indicated above, by virtue of the 90 degree phase relationship between the signal voltages delivered to the control grids of the two inverter tubes 403a and 403b and because of the one hundred and eighty degree phase relationship obtained between the two signal output voltages of each of these inverter tubes, the four stator plates of each of the four-phase condensers 404a and 404b are excited by one megacycle signal voltages of equal amplitude which are displaced in phase by 90 degrees. From this point on, only the operations which occur in the pulse forming channel 500a will be described, since those occurring in the second pulse forming channel 500b are identical. The rotor element 431a of the four-phase condenser 404a is so shaped and positioned relative to the four stator plates as to have a signal voltage developed thereon which varies in phase relative to the condenser stator voltages as a function of the vector sum of the electrostatic fields embraced thereby. Hence by rotating this element to a particular position relative to the four stator plates, a signal voltage is developed on this element having the desired phase relationship relative to the signal voltage developed on the rotor 431b of the condenser 404b. In other words, through rotation of the rotor elements 431a and 431b signal voltages are developed on these elements which may be varied in phase relative to each other through any desired phase angle up to and including 360 electrical degrees. Moreover, this adjustment of the phase relationship between the signal voltages produced on the rotor elements 431a and 431b of the two condensers is obtained without varying the amplitude of the voltage on either rotor element.

The voltage developed between the rotor element 431a and ground is impressed between the cathode and control grid of the amplifier tube 405a in an obvious manner and after amplification through this tube is impressed upon the input electrodes of the second amplifier tube 406a through the coupling condenser 432a. As a result of the signal amplification produced by the two tubes 405a and 406a and the additive action of the tuned circuit 401a further to increase the amplitude of the signal voltage, this voltage as impressed between the cathode and control grid of the pulse former tube 502a through the condenser 507a is of sufficient amplitude completely to overload the pulse former tube. More specifically, during each positive half cycle of the signal voltage appearing across the tuned circuit 501a, the control grid of the tube 502a in conjunction with the crystal rectifier 506a conduct, thus charging the coupling condenser 507a to a value equal to the amplitude of the signal voltage. During each negative half cycle of the signal voltage, the control grid potential of the tube 502a is driven well beyond cutoff. In this manner, the signal voltage is clamped to the cathode potential of the tube 502a, resulting in an intermittent flow of plate current through the tube similar to that which occurs in a class C amplifier.

During each positive half cycle of the signal voltage applied to the control grid of the tube 502a, a sharp increase is produced in the current flow through the self-resonant inductance element 508a. As a result, this element is shock excited to develop a transient wave train which oscillates at the natural resonant frequency of the element 508a, i. e., at a frequency of 2½ megacycles. The character of this wave train is such that during the first half cycle thereof the upper terminal of the element 508a is negative relative to the lower terminal of the element. Moreover, the shunting crystal rectifier 509a is so poled as to be non-conducting during the first half cycle of the oscillatory transient developed across the element 508a. However, when the polarity of the voltage across the element 508a reverses during the second half cycle of the oscillatory wave train, the crystal rectifier 509a becomes conductive to absorb all of the transient energy stores in the element 508a. Thus, only the first half cycle of the oscillatory transient as it appears at the top terminal of the element 508a is permitted to endure. This voltage half cycle or pulse is of negative polarity. Since the element 508a is self-resonant at a frequency of 2½ megacycles, it will be understood that the first negative half cycle of each transient wave train produced across this element persists for an interval of only one fifth of a microsecond. Thus as the signal voltage is continuously impressed upon the control grid of the tube 502a, pulses of negative polarity are developed across the output circuit of this tube which have a repetition rate of one megacycle, but in which the pulse persistence interval is limited to one fifth of microsecond. These successive pulses are obviously spaced by an interval of 4/5 of a microsecond.

The narrow negative pulses thus produced across the output circuit of the tube 502a are impressed upon the control grid of the inverter tube 503a through the coupling condenser 514a. This tube functions to amplify the pulses and invert the same so that they appear as positive pulses at the anode of this tube. In this regard, it is noted that the control grid of the tube 503a is normally positively biased from the anode current supply source through the resistor 510a to a value such that plate current flow through the inverter tube 503a is at the saturation value. By thus normally biasing the tube 503a to the plate current saturation point, the reference potential relative to which the pulses are repeated by the tube 503a is positively clamped at a fixed value, with the result that variations in the pulse amplitude as a consequence of relatively slow changes in the reference voltage level are minimized.

The pulses of positive polarity developed at the output side of the inverter tube 503a are repeated to the control grids of the cathode follower tubes 504a and 505a in parallel. At this stage, the input pulses are clamped positively by virtue of grid conduction of the two tubes. In order to provide a tighter clamp with larger plate currents and output pulses as a result, the control grids are returned through the resistor 512a to the anode current supply source. The pulses applied to the control grids of the two cathode follower tubes 504a and 505a are obviously repeated across the cathode load resistor 513a common to these two tubes. This resistor functions as the output load impedance of the pulse forming channel 500a. More particularly, the commutator drive conductor 41 is connected to the cathode terminal of the resistor 513a, such that the narrow pulses formed in the channel 500a are repeated positively to the input terminal of the commutator drive circuit 25.

The second pulse forming channel 500b operates in exactly the same manner as the pulse forming channel 500a to produce positive pulses on the ring drive pulse conductor 40 each having a pulse persistence interval of one fifth microsecond and having a repetition rate of one megacycle. As will be evident from the above explanation, however, the phase relationship between the pulses respectively developed on the conductors 40 and 41 may be varied as desired by suitable adjustment of one or both of the four-phase condensers 404a and 404b. In actual practice, it is preferred to so phase the pulses produced on these conductors that each pulse developed on the conductor 41 is disposed approximately midway between two successive pulses produced on the conductor 40; this for the purpose of centering the signal sampling pulses developed by the channel pulse commutator 22 within the units gate pulses developed by the units pulse generating circuit 20.

*Commutator drive circuit 25*

This circuit, as shown in Fig. 6 of the drawings, is provided for the purpose of amplifying the positive pulses appearing on the commutator drive pulse conductor 41 and to act as an impedance matching network. As previously pointed out, the pulses produced at the output terminals of this circuit are delivered over the conductor 35 to the channel pulse commutator 22 and directly to the signaling system 10. The pulse power requirements of these parallel connected components are fairly severe, which in part necessitates provision of the circuit 25 to amplify the pulses on the conductor 41 sufficiently to satisfy the pulse load requirements of the system.

In brief, the circuit 25 comprises a pulse inverter tube 600 in the form of a commercial type 6C4 triode, a pulse amplifier tube 601 in the form of the commercial type 6AK6 pentode and a cathode follower tube 602 connected in tandem in the order named. In actual practice the cathode follower tube 602 may comprise one section of a commercial type 6AS7 twin triode. More specifically the input electrodes of the inverter tube 600 are coupled to the output load resistor 513a of the pulse forming channel 500a over a path which includes the commutator drive conductor 41 and a coupling condenser 603. A resistance-capacitance coupling network comprising the two resistors 605 and 606 and a coupling condenser 608 is employed to impress the pulses developed at the anode of the inverter tube 600 upon the input electrodes of the amplifier tube 601. Similarly, a resistance-capacitance coupling network comprising the resistors 612 and 614 and a condenser 613 is employed to impress the pulses developed at the anode of the amplifier tube 601 upon the input electrodes of the cathode follower tube 602. Self-resonant inductance element 607 and 610 are respectively provided in the output circuits of the inverter and amplifier tubes 600 and 601 to act as high frequency compensators and thus prevent widening of the very narrow pulses which are transmitted through the drive circuit 25. These inductance elements each have a natural resonant frequency falling somewhere in the four to five megacycle range. Bias potential for the control grid of the cathode follower tube 602 is supplied through the resistor 604 from a voltage dividing network comprising two resistors 615 and 617 which are connected in series across a one hundred volt bias potential source. Specifically, the voltage drop across the resistor 615 is negatively applied to the control grid of the cathode follower tube 602 through the resistor 614 to establish the normal operating bias level of this grid. The biasing resistor 615 is bypassed at the channel pulse frequency by means of a bypass condenser 616 connected in shunt therewith. As shown, the output circuit of the cathode follower tube 602 comprises a coaxial cable 618, the distant or remote terminals of which are bridged by a load resistor 619. More specifically, the upper terminal of the resistor 619 is connected through the control conductor of the cable 618 to the cathode of the tube 602 and the lower terminal of this resistor is connected to the grounded sheath of the cable.

In considering the operation of the commutator drive circuit 25, it will be remembered that the pulses applied to the commutator drive conductor 41 at the output side of the pulse forming channel 500a are of positive polarity. Each of these pulses as impressed upon the control grid of the inverter tube 600 through the coupling condenser 603 has the effect of increasing space current flow through the tube 600 to produce a corresponding amplified negative pulse at the anode of this tube which is repeated through the coupling condenser 608 to the control grid of the amplifier tube 601. The crystal rectifier 604 shunting the input electrodes of the inverter tube 600 is so poled as to be conductive during each on-pulse period. Hence, during each such interval, grid and crystal current flows to charge the condenser 603. During each off-pulse period, the condenser 603 retains its charge so as to bring the tube 600 below cutoff. Thus the crystal rectifier 604 has the effect of clamping the pulse amplitude to ground as a reference potential, i. e., functions to prevent any appreciable variation in the amplitude of the pulses developed at the output side of the inverter tube 600.

In the amplifier tube 601, the pulses are amplified to further increase the amplitude thereof and are inverted in polarity, so that they are repeated as positive pulses through the coupling condenser 613 to the control grid of the cathode follower tube 602. In this regard it is noted that plate current flow through the tube 601 is normally at the saturation value by virtue of the positive potential impressed upon the control grid of this tube through the grid current limiting resistor 605. Thus the anode poential level of this tube is clamped to a fixed value to prevent variations in the pulse base line voltage level and consequent amplitude distortion of the pulses. During each off-pulse period, the condenser 608 is completely discharged through the inductance element 607 and the resistors 605 and 606.

The cathode follower tube 602 is normally biased beyond cutoff by the voltage negatively applied to its control grid through the resistor 614. However, each pulse positively impressed upon the control grid of this tube drives the grid positive to the plate current saturation value thereof. Thus each pulse as reproduced in amplified form across the cathode load circuit of the tube has both its peak amplitude and base clamped to a fixed value such that successive pulses are of the same constant amplitude. More particularly, the pulses appear in amplified form across the cathode load resistor 619 and are distributed as positive drive pulses over the pulse distributing conductor 35 to the channel pulse commutator 22 and the signaling system 10. In this connection, it is pointed out that the cathode load impedance of the cathode follower tube 602 is approximately 72 ohms which means that variations in the load imposed upon the commutator drive circuit 25 do not appreciably change the amplitude of the pulses appearing on the channel pulse conductor 35. This low output impedance is in contrast with the output impedance of the pulse forming channel 500a which is of the order of 270 ohms. It should also be understood that tremendous amplification of the pulses is provided by the three tubes 600, 601 and 602 as the pulses are transmitted through the commutator drive circuit 25.

Ring circuits 20 and 21

As previously pointed out in the general description of the system, the units pulse ring circuit 20 and the tens pulse ring circuit 21 are identical in circuit arrangement. Accordingly, only the details of the units pulse ring circuit 20 have been illustrated in Figs. 9 and 10 of the drawings. The purpose of the units pulse ring circuit 20, it will be recalled, is that of converting the ring drive pulses developed on the ring drive pulse conductor 40 by the pulse forming channel 500b of the circuit 19 into positive and negative units pulses of a finite and greater width than the channel pulses developed by the commutator drive circuit 25 and of diverting or commutating the negative units pulses thus developed successively to the negative units pulse conductors 30a, 30b—30j, and the positive units pulses successively to the positive units pulse conductors 31a, 31b—31j. In general, the units pulse ring circuit 20 comprises an impulse repeating and amplifying tube 1000 of the 6J6 type connected to operate as a cathode follower in repeating the drive pulses to the ring drive conductor 1065, and ten units pulse forming and gating stages of which the first three and tenth stages are illustrated. Each units pulse gating and forming stage of the circuit 20 comprises four tubes which for convenience of explanation have been arranged in vertical alignment in Figs. 9 and 10 of the drawings. Thus the first pulse forming and gating stage comprises the vertically aligned tubes 1001, 1011, 1021 and 1031, the second stage comprises the four vertically aligned tubes 1002, 1012, 1022 and 1032, the third stage comprises the four vertically aligned tubes 1003, 1013, 1023 and 1033 and the last or tenth stage comprises the four vertically aligned tubes 900, 910, 920 and 930. Considered on the basis or horizontal alignment, the tubes 1001, 1002, 1003, 900, 1011, 1012, 1013 and 910 in the two upper rows are ring circuit tubes, the tubes 1021, 1022, 1023 and 920 in the third row function as amplifier and inverter tubes and the tubes 1031, 1032, 1033 and 930 function as output tubes. All tubes in the circuit 20 with the exception of the input pulse amplifying and repeating tube 1000 and the output tubes 1031, 1032, 1033—930 are commercial type 6AK6 pentodes.

The output tubes 1031, 1032, 1033 and 930 are commercial type 6AS7 triodes.

More specifically considered, the two top tubes of each units pulse forming and gating stage are connected in the manner more fully explained below to function as an Eccles-Jordan flip-flop circuit, such that the ten pairs of tubes in the two upper horizontal tube rows effectively comprise a pulse commutating ring circuit. The successive responses of the ten Eccles-Jordan circuits to successive drive pulses developed on the ring drive conductor 1065 result in the production of pulses at successive stages of the ring circuit which are respectively repeated through the coupling condensers 1051a, 1051b, 1051c—1051j, to the control grids of the amplifier and inverter tubes 1021, 1022, 1023—920. These tubes in amplifying and inverting the pulses successively received on the control grids thereof repeat the same in amplified form through the condensers 1055a, 1055b, 1055c—1055j, successively to the control grids of the output tubes 1031, 1032, 1033—930. In responding to the pulses successively impressed upon the control grids thereof, the identified output tubes develop negative units pulses successively on the units pulse conductors 30a, 30b, 30c—30j and simultaneously develop positive units pulses successively on the positive units pulse conductors 31a, 31b, 31c—31j in the manner explained below.

In considering the operation of the units pulse ring circuit 20, it is pointed out that the positive drive pulses developed on the ring drive conductor 40 by the pulse forming channel 500b of the phase shift and pulse forming circuit 19 are positively repeated by the tube 1000 through the coupling condenser 1062 to the ring drive conductor 1065. Specifically, each pulse appearing on the conductor 40 produces a voltage drop across the resistor 1060 which drives the parallel connected grids of the tube 1000 positive to produce a corresponding increase in the voltage across the cathode load resistor 1061 of this tube. Each time a positive pulse is thus produced across the resistor 1061 current flows through the condenser 1062 and the series connected resistors 1063 and 1064 to increase the positive potential on the ring drive conductor 1065. Thus the positive input or drive pulses to the units pulse ring circuit 20 are amplified through the tube 1000 and repeated to the ring drive conductor 1065. The two condensers 1059 and 1062 are of such size as to fully discharge during each period separating successive pulses on the conductor 40. Thus the condenser 1059 is provided with a discharge path which includes the resistors 1060 and 513b. Similarly, the condenser 1062 is provided with a discharge path which includes the resistors 1061, 1063, and 1064.

In order to start the circuit, the switch 1067 is closed to bridge the voltage dropping resistor 1068 and the condenser 1069 in series across the terminals of the negative one hundred volt bias potential source and the positive one hundred and fifty volt anode current source in series. This operation has the effect of producing a heavy current flow through the series connected elements to produce voltage drops thereacross. Initially the major portion of the available two hundred and fifty volts supplied by the two hundred and fifty volts supplied by the two sources appears across the resistor 1068. However, as the condenser 1069 charges up, the voltage drop across the resistor 1068 is decreased to its normal value. The transient voltage which is thus developed across the resistor 1068 has the effect of shock exciting one stage of the ring circuit into operation. After operation of the ring circuit is initiated, the switch 1067 may be opened and the circuit will continue to operate in the manner explained below. It has been found that the described method of starting the ring circuit positively precludes the possibility of two or more stages of the circuit starting to operate simultaneously.

With the ring circuit in operation, only one of the tubes 1001, 1002, 1003—900 in the upper horizontal string is off, i. e., non-conducting and only a corresponding one of the tubes 1011, 1012, 1013—910 in the second horizontal string is on, i. e., conducting at any given instant. Assume now that in the upper horizontal tube string, the tube 1001 is not conducting with all other tubes of this string conducting and that in the second horizontal string the tube 1011 is conducting with all other tubes of this string not conducting. With the circuit in this condition, anode current is delivered to the nine on string tubes 1002, 1003—900 through the resistors 1043b, 1043c, etc., and the inductance elements 1044b, 1044c, etc., and the common voltage dropping resistor 1041 from the anode current source which has a terminal voltage of one hundred and fifty volts. These impedance elements are so proportioned that the voltage drop across the resistor 1041 is approximately 75 volts, which means that the anode potential on the non-conducting tube 1001 is 75 volts and the anode potentials of the other tubes of the on-string are appreciably less than 75 volts. The control grid of the off-string tube 1011 is connected directly to the anode of the on-string tube 1001, such that when the tube 1001 is not conducting the control grid of the tube 1011 has a positive potential of 75 volts impressed thereon relative to ground. However, with the off-string tube 1011 conducting, the current traversing this tube and the resistors 1063 and 1064 causes a voltage drop to be produced across the two identified series connected resistors which has a magnitude of approximately 75 volts. Thus the cathode of the tube 1011 is operating at a positive potential which is substantially the same as the control grid potential of this tube. The bias voltage on the control grid of the tube 1001 is obviously a function of the voltage drop across the resistor 1046a, which in turn is a function of the magnitude of current flow through the tube 1011 and the series connected resistors 1047a and 1049a. More specifically, with the tube 1011 conducting, the voltage drop across the resistor 1046a is relatively low, i. e., of the order of 80 volts, such that the control grid of the tube 1001 is negatively biased to a potential of approximately 20 volts with respect to the tube cathode and the tube is thus biased beyond cutoff.

With the circuit in the condition just described, the next positive drive pulse produced on the drive pulse conductor 1065 in the manner explained above has the effect of increasing the cathode potential of the tube 1011 positively by an amount sufficient to cut off space current flow through this tube. In response to this operation, current flow through the resistor 1046a is increased to decrease the bias on the control grid of the tube 1001 sufficient to render the latter tube conductive. As the tube 1001 starts to conduct, its anode becomes less positive due to the voltage drop across the inductance element 1044a and the resistor 1043a, with the result that a negative pulse is transmitted through the condenser 1045a to the control grid of the next on-string tube 1002. This pulse is of sufficient amplitude to drive the control grid of the tube 1002 beyond cutoff. As a consequence, the tube 1002 stops conducting and the anode potential thereof rises to increase the positive potential on the control grid of the companion off-string tube 1012. So long as the positive drive pulse persists on the conductor 1065 to hold the cathode potential of the tube 1012 at a high positive level, the tube cannot conduct even though the control grid potential is positively increased in the manner just described. However, when the drive pulse on the conductor 1065 ends, the cathode potential of the tube 1012 drops sufficiently to render this tube conductive under the influence of the increased positive potential impressed on the control grid of the tube from the anode of the tube 1002. As soon as the tube 1012 starts to conduct, the voltage drop across the resistor 1046b is decreased to a value such that the tube 1002 remains biased beyond cutoff from the negative one hundred volts bias potential source. Thus, the tube 1002 is held non-conductive after the pulse transmitted to the control grid thereof through the condenser 1045a ends. In this connection, it is pointed out that the condenser 1045a is chosen to have a capacitance value such that the negative pulse impressed upon the control grid of the tube 1002 cannot die out to render this tube conductive before the driving pulse on the conductor 1065 ends. This condenser is also made small enough so that it is fully discharged before it is again called upon to deliver a negative pulse to the control grid of the tube 1002.

When the tube 1001 is rendered conductive to reduce the anode potential thereof in the manner just explained, the potential on the control grid of the tube 1011 is reduced to a value such that when the drive pulse on the conductor 1065 ends the tube 1011 is still biased beyond cutoff. Thus current conduction through the tube 1001 has the effect of preventing current flow through the tube 1011 after the pulse on the drive conductor 1065 is terminated.

In a manner entirely similar to that just described, the next succeeding pulse developed on the drive conductor 1065 has the effect of arresting current conduction through the tube 1012, starting current conduction through the tube 1002, arresting current conduction through the tube 1003 and starting current conduction through the tube 1013. The manner in which additional pulses appearing on the drive conductor 1065 successively activate the fourth to tenth stages of the ring circuit will be entirely apparent from the preceding explanation. In this regard, it is noted that when the tenth pulse is delivered to the ring circuit from the drive conductor 1065 to cut off space current conduction through the tube 910 and render the tube 900 conductive, a negative pulse is transmitted through the condenser 944j to cut off spaced current flow through the tube 1001, with the result that this tube is rendered non-conductive and the tube 1011 is rendered conductive when the tenth drive pulse on the drive conductor 1065 ends.

From the above explanation it will be apparent that as successive drive pulses appear on the drive conductor 1065, the ten stages of the ring circuit comprising the two upper horizontal tube strings are sequentially activated. In order to prevent more than one stage of the ring circuit from responding to any given drive pulse, the resistors 1063 and 1064 are so proportioned that if two of the off-string tubes 1011, 1012—910 start to conduct simultaneously a voltage drop is produced across these resistors which has the effect of biasing both of the conducting tubes beyond cutoff. As a practical matter, this is accomplished by adjusting the short circuiting wiper 1064a along the resistor 1064 to a point where current flow through any one of the tubes 1011, 1012—910 and the resistors 1063 and 1064 has the effect of biasing these tubes fairly close to the cutoff point. It will be understood that with the circuit adjusted in this manner, positive drive pulses of relatively low amplitude appearing on the drive conductor 1065 will have the effect of switching the ring circuit in the manner explained above. Another important feature of the ring circuit is the use of coupling condensers 1045a, 1045b, 1045c—944j connected between the anodes and control grids of successive tubes 1001, 1002, 1003—900 of the on-string rather than between successive tubes 1011, 1012, 1013—910 of the off-string. This arrangement is of importance for the reason that since the tubes of the off-string are normally biased considerably beyond cutoff, a relatively large change in the potentials on the control grids thereof would be required to effect the described stage switching operations in response to delivery of successive drive pulses to the ring circuit. On the other hand, the control grids of the on-string tubes 1001, 1002, 1003—900 are normally biased to saturation through the resistors 1046a, 1046b, 1046c—946j. As a consequence, delivery of a small negative pulse to the control grid of any on-string tube, as to the control grid of the tube 1002 through the condenser 1045a, for example, has the effect of cutting off space current flow through the tube.

In considering the manner in which the step-by-step operation of the ring circuit results in the production of positive and negative units pulses successively on the negative units pulse conductors 30 and the positive units pulse conductors 31, it is first pointed out that normally the amplifier and inverter tubes 1021, 1022, 1023—920 are conducting heavily. Thus, the control grids of these tubes are respectively connected through the grid current limiting resistors 1052a, 1052b, 1052c—952j directly to the positive terminal of the anode current source, so that heavy grid and anode currents flow in these tubes. On the other hand, the tubes 1031, 1032, 1033—930, constituting the output string, are normally biased beyond cutoff by the charges accumulated on the respective associated condensers 1055a, 1055b, 1055c—955j.

With the ring circuit operating in the manner described above, negative pulses are developed on the negative units pulse conductors 30a, 30b, 30c—30j and positive pulses are developed on the positive units pulse conductors 31a, 31b, 31c—31j only when the respective corresponding tubes 1011, 1012, 1013—910 are conducting. Thus a negative pulse is developed on the negative units pulse lead 30a and a positive pulse is developed on the positive units pulse lead 31a when the tube 1011 is rendered conductive under the influence of a driving pulse on the conductor 1065. More specifically, when the tube 1011 is rendered conductive to produce space current flow therethrough, the positive potential of its anode is decreased to transmit a negative pulse through the coupling condenser 1051a to the control grid of the tube 1021. This pulse, during its persistence interval, has the effect of decreasing space current flow through the tube 1021 to produce a corresponding increase in the positive anode potential of the tube. As a result, the pulse is inverted to a positive pulse and repeated in amplified form through the condenser 1055a to the control grid of the output tube 1031. This repeated positive pulse is of very large amplitude and has the effect of driving the control grid of the tube 1031 sufficiently positive to saturate space current flow through the tube. Thus, the tube 1031, which as explained above is normally cut off, is abruptly rendered conductive at its saturation level. During the conducting interval of the tube 1031, the condenser 1055a is heavily charged by grid current flow through this tube, such current flow occurring over a path which extends from positive terminal of the anode current source by way of the resistor 1053a, the inductance element 1054a, the condenser 1055a, the grid-cathode path in the tube 1031, and the resistor 1070a to the grounded negative terminal of the anode current source. As a result of the heavy anode current flow thus produced through the tube 1031, the voltage drop across the cathode resistor 1070a is sharply increased to produce the desired positive pulse on the units conductor 31a. Concurrently therewith, the voltage drop across the anode load resistor 1071a is sharply increased to correspondingly decrease the potential on the negative units pulse conductor 30a and thus develop the desired negative pulse on this conductor.

The duration of the pulses thus developed on the units pulse conductors 30a and 31a is measured by the spacing interval between two successive drive pulses appearing on the ring drive conductor 1065. Thus when the next succeeding drive pulse is developed on this conductor to render the tube 1011 non-conductive in the manner explained above, the positive anode potential of this tube is sharply increased to produce a corresponding sharp increase in current flow through the tube 1021. As a result, the positive anode potential of the tube 1021 is sharply decreased. More specifically, the voltage at the anode of the tube 1021 is less than the voltage across the condenser 1055a, which is now negatively applied to the control grid of the tube 1031, by an amount sufficient to cut off space current flow through the latter tube. As a consequence, the voltage drops across the resistors 1070a and 1071a are sharply decreased to their reference value levels to terminate the pulses on the conductors 30a and 31a.

In a manner entirely similar to that just described, negative and positive units pulses are respectively produced on the conductors 30b and 31b during successive intervals of conduction of the tube 1012. Similarly, positive and negative pulses are respectively produced on the conductors 31c and 30c during those intervals when the tube 1013 is conducting. Thus it will be understood that negative units pulses are successively produced on the conductors 30a, 30b, 30c—30j and positive units pulses are concurrently produced on the conductors 31a, 31b, 31c—31j during sustained operation of the ring circuit.

As will be apparent from the preceding explanation the units pulses produced by each of the tubes 1031, 1032, 1032—930 are developed by switching each tube from a completely non-conductive state to a condition where anode current flow through the tube is at the saturation level. This insures the production of units pulses of uniform amplitude having clean tops. As will also be apparent from the preceding explanation, each of the coupling condensers 1051a, 1051b, 1051c—951j is only required to hold the control grid potential of the associated one of the tubes 1021, 1022, 1023—920 at the pulse producing level for an interval equal to the period separating two successive pulses on the drive conductor 1065. Accordingly, these condensers may be relatively small. During the interval separating pulse transmission by each of these condensers and equal to the sum of nine units pulse periods, each condenser is fully discharged through one of the respective associated resistors 1052a, 1052b, 1052c—952j. On the other hand, each of the condensers 1055a, 1055b, 1055c—955j is required ot hold its charge during each spacing interval separating two pulse transmission periods thereof, i. e., during intervals each equal to the sum of nine units pulse periods. Accordingly these condensers are relatively large. During such spacing intervals these condensers discharge through their respective associated ressitors 1056a, 1056b, 1056c—956j. However, these resistors have very high resistance values such that the condenser discharge rate is low. The inductance elements, such as the elements 1044a, 1048a and 1054a, respectively provided in the anode circuits of the tubes forming the upper three rows serve the function of preventing width distortion of the pulses. Each of these elements is self resonant at a frequency of four to five megacycles.

As indicated above, the circuit arrangement of the tens pulse ring circuit 21 and the mode of operation of this circuit to produce the negative tens pulses successively on the conductors 33a, 33b—33j, and the positive tens pulses successively on the conductors 32a, 32b—32j are identical with the circuit arrangement and mode of operation of the units pulse ring circuit 20 just described. However, the driving pulses for the tens pulse ring circuit 21 are derived from the tenth units pulse forming and gating stage of the units pulse ring circuit 20. More specifically, the positive units pulses appearing on the units pulse conductor 31j are employed to drive the ring circuit 21 through the pulse differentiating and drive circuit 901 which functions to differentiate the leading edge of each pulse. This circuit may, if desired, be identical with the circuit 44 illustrated in Fig. 13 of the drawings. It will be understood, therefore, that the stage switching operations effected in the tens pulse ring circuit 21 occur at one tenth the stage switching rate employed in the units pulse ring circuit 20. In other words, one positive and concurrent negative tens pulse is produced for each ten units pulses developed by the units pulse ring circuit 20. Due to the longer time intervals involved in the stage switching operations of the tens pulse ring circuit 20, the circuit constants of certain of the circuit components embodied in this circuit are different from those of the corresponding components of the units pulse ring circuit. This is particularly true of those condensers of the tens pulse ring circuit 21 which respectively correspond to the condensers 1050a, 1051a and 1055a, and those resistors of the tens pulse ring circuit which respectively correspond to the resistors 1068 and 1063 of the units pulse ring circuit 20. Aside from the differences noted, the two ring circuits 20 and 21 are identical and it is believed that the mode of operation of the tens pulse ring circuit will be readily apparent from the explanation given above with reference to the units pulse ring circuit 20.

*Channel pulse commutator 22*

As generally indicated above, this circuit is provided sequentially to gate the pulses developed in the pulse forming channel 500a over the conductors 34a, 34b—34j to the signaling system 10. In brief, this circuit, the details of which are illustrated in Figs. 7 and 8, comprises two parallel connected cathode follower tubes 840 and 841, to which drive pulses are delivered from the commutator drive circuit 25 over the conductor 35; ten pulse gating tubes 801, 802, 803, 804, 805, 706, 707, 708, 709 and 700, which are jointly controlled by the drive pulses repeated thereto by the tubes 840 and 841 and also by positive units pulses delivered thereto over the units pulse conductors 31a, 31b—31j sequentially to gate the drive pulses to ten inverter and amplifier tubes 811, 812, 813, 814, 815, 716, 717, 718, 719 and 710; and ten cathode follower tubes 821, 822, 823, 824, 825, 726, 727, 728, 729 and 720 to which the amplified pulses are sequentially repeated by the inverter tubes 811, 812—710. Effectively, therefore, the channel pulse commutator 22 is comprised of ten pulse gating stages, the first of which comprises the three vertically aligned tubes 801, 811, and 821, the second of which comprises the three vertically aligned tubes 802, 812, and 822, and so on to the last stage, which comprises the tubes 700, 710 and 720. The cathode follower tubes 840 and 841 are twin triodes of the 6J6 type, the ten gating tubes 801, 802—700 are pentodes of the 6AS6 type, the inverter and amplifier tubes 811, 812—710 are pentodes of the 6AK6 type, and the cathode follower tubes are triodes of any suitable commercial type. If desired, five triodes of the 6AS7 type may be employed to replace the triodes 821, 822—720 in pairs; that is, five twin triodes of the 6AS7 type may be used in lieu of the ten triodes shown. The circuit components employed to couple the identified tubes of the channel pulse commutator 22 with the units pulse ring circuit 20, the commutator drive circuit 25 and with each other are described below in terms of the functions which they respectively perform in the network.

Normally, i. e., in the absence of pulses on the drive conductor 35, the control grids of the cathode follower tubes 840 and 841 are negatively biased with respect to the cathodes of these tubes through the resistor 843 by an amount equal to the voltage drop across the cathode load resistor 844. The control grids of the gating tubes 801, 802—700 are connected in parallel and coupled to the load terminal of the cathode load resistor 844 through a coupling condenser 846. The manner in which these control grids are normally biased to the same predetermined operating potential is explained more fully below. Positive units pulses are sequentially impressed upon the suppressor grids of the gating tubes 801, 802—700 over the positive units pulse conductors 31a, 31b—31j and through the coupling condensers 831a, 831b—731j. From an inspection of the circuit, it will be noted that the control grids of the amplifier and inverter tubes 811, 812—720 are connected directly to the positive terminal of the anode current source through the resistors 833a, 833b—733j. Thus, these tubes are normally heavily conductive, the control grids thereof being biased positively relative to the tube cathodes to produce grid current flow through the tubes which is limited only by the resistors 833a, 833b—733j. The normal bias for the control grids of the ten cathode follower tubes 821, 822—720 is in part determined by the voltages respectively developed across the coupling condensers 838a, 838b—738j during operation of the circuit and also by a fixed bias voltage derived from a biasing network which comprises the series connected resistors 741 and 742 and a by-pass condenser 740.

In considering the operation of the commutator 22, it will be understood that the drive pulses transmitted from the commutator drive circuit 25 over the conductor 35 and impressed upon the control grids of the tubes 840 and 841 through the coupling condenser 842 are repeated as positive pulses across the cathode load resistor 844. These pulses are impressed upon the parallel connected control grids of the gating tubes 801, 802—700 through the coupling condenser 846. They occur at a frequency rate of one megacycle and, as will be apparent from the preceding explanation, are synchronized with the positive units pulses successively impressed upon the control grids of the gating tubes over the conductors 31a, 31b—31j. Thus each of the gating tubes 801, 802—700 has a positive units pulse impressed upon the suppressor grid thereof in synchronism with each tenth drive pulse impressed upon its control grid through the coupling condenser 846. Moreover, each drive pulse is time positioned to occur at the approximate center of the coincident units pulse. Normally the gating tubes 801, 802—700 are biased well beyond cutoff by the voltage developed across the condenser 846 and negatively applied to the control grids of the gating tubes during each off-pulse period. More specifically, each time a positive pulse appears across the cathode load resistor 844, the condenser 846 is rapidly charged through the clamping crystal rectifier 845. When the pulse terminates, the condenser 846 cannot discharge through the rectifier 845 and has a voltage thereacross which is substantially greater than the normal off-pulse voltage across the resistor 844. This condenser voltage is applied negatively to the control grids of the ten gating tubes 801, 802—700 and is so much greater than the voltage across the resistor 844 that the gating tubes are biased beyond cutoff. Thus the rectifier 845 functions to clamp the drive pulse reference line voltage at a fixed negative value equal to the amplitude of the drive pulses. The amplitudes of the positive units pulses successively applied to the suppressor grids of the ten gating tubes must be larger than the cutoff potential of the suppressor grids of the gating tubes. In other words, the magnitude of the positive units pulses is sufficient to cause plate current cutoff between pulses in spite of any control grid action. However, and considering the first stage of the commutator 22 by way of example, when a drive pulse is applied to the control grid of the tube 801 coincident with the application of a positive units pulse to the suppressor grid of this tube, the tube is rendered conductive for the very short interval during which the drive pulse persists. This same action occurs successively at the other nine stages of the commutator 22 as drive and units pulses are coincidentally applied to the control and suppressor grids of the gating tubes 802, 803—700. When the tube 801 is thus rendered conductive, the anode potential thereof drops abruptly to repeat the drive pulse negatively through the coupling condenser 832a to the control grid of the amplifier and inverter tube 811. As a result, space current flow through the tube 811 is abruptly decreased at the start of the pulse and abruptly increased at the end of the pulse. Tremendous pulse amplification is obtained in the tube 811. Since space current flow through this tube is sharply decreased during the pulse period to effect a sharp increase in the anode potential of the tube, it will be understood that the pulse is repeated positively through the coupling condenser 838a to the control grid of the cathode follower tube 821. The magnitude of this repeated pulse is sufficient to drive the control grid of the tube 821 positive relative to the cathode of the tube, thereby to produce grid current flow in the tube. This current charges the coupling condenser 838a. During the pulse interval, the tube 821 conducts heavily to repeat the pulse across its cathode load resistor 843a. Thus a drive pulse having the persistence interval of the drive pulse impressed upon the control grid of the gating tube 801 is developed positively on the channel pulse conductor 34a. After the drive pulse ends, such that the gating tube 801 is again biased below cutoff and normal heavy space current flow through the amplifier and inverter tube 811 is resumed, the condenser 838a is left charged to a voltage which biases the cathode follower tube 821 considerably beyond cutoff. Thus the latter tube is rendered non-conductive immediately the pulse ends. The condenser 838a holds its charge until the tubes 801 and 811 are again activated to transmit a pulse through this condenser to the control grid of the cathode follower tube 821. The fixed bias impressed upon the cathode follower tubes from the bleeder resistors 741 and 742 prevents these tubes from losing bias and drawing excessive current when either gate or driving pulses are missing.

The manner in which the nine other stages of the commutator 22 function successively to produce pulses on the other nine channel pulse conductors 34b, 34c—34j is exactly the same as the described mode of operation of the first commutator stage and will readily be understood from the preceding explanation. It will thus be understood that during operation of the system the commutator 22 functions continuously to commutate channel pulses to the ten channel pulse conductors 34a, 34b—34j in sequence. These pulses are of positive polarity and each thereof has a persistence interval of one fifth of a microsecond. In order to prevent width distortion of the pulses as the described pulse commutating action is effected in the commutator 22, inductance elements 835a, 836a, 835b, 836b, etc., each self-resonant at a frequency of from four to five megacycles, are respectively provided in the anode circuits of the gating and inverter tubes in the manner illustrated. It will be understood from the above explanation that while the pulses are produced at the fundamental frequency rate of one megacycle, they recur on each of the channel pulse conductors 34a, 34b—34j at a frequency rate of one hundred kilocycles.

Referring now more particularly to Figs. 11 to 14, inclusive, of the drawings, the signaling system 9 there illustrated is provided for the purpose of transmitting signals between the plurality of lines 8 on a time multiplex basis. Preferably, the system 9 is in the form of an all-electronic automatic telephone system of the improved form disclosed and claimed in copending application Serial No. 134,974, filed December 24, 1949, Frank A. Morris and Robert B. Trousdale. In general and as shown diagrammatically in Fig. 11 of the drawings, the pulse generating apparatus provided to drive the signal transferring components of the system 9 is quite similar to that shown in Fig. 1 and described above. Accordingly, corresponding components of the pulse generating equipment diagrammatically shown in Figs. 1 and 11 of the drawings have been identified by the same reference characters.

In the pulse generating aparatus shown in Fig. 11, the master oscillator 18, the phase shift and pulse forming circuit 19, the units pulse generating circuit 20, the group pulse generating circuit 21, the channel pulse commutator 22 and the commutator drive circuit 25 are substantially identical with the corresponding components of the apparatus shown in Fig. 1 and the details of which are described above. However, in the signalling system 9, only group pulses, units pulses, channel pulses and drive pulses of positive polarity are required. Accordingly, the units pulse generating circuit 20 and the group pulse generating circuit 21 are only used to develop positive pulses on the conductors 31 and 32, respectively. The signaling system 9 further requires phase displacement or, more properly, facilities for phase adjustment between the channel pulses commutated to the ten channel pulse conductors 34 and the drive pulses which are transmitted to the signaling system over the drive pulse conductor 47. Facilities are also required for centering the commutator drive pulses delivered to the channel pulse commutator 22 within the units pulses delivered to this commutator from the units pulse generating circuit 20. In order to take care of these two requirements, the master oscillator 18 is arranged to excite a pulse forming circuit 42 in addition to the phase shift and pulse forming circuit 19, so that through adjustment of the elements 404a and 404b embodied in the phase shift and pulse forming circuit 19, the pulses delivered to the output conductors 40 and 41 may be adjusted in phase relative to each each and also relative to the pulses delivered to the output conductor 48 by the pulse forming circuit 42.

In order more accurately to synchronize the start of each operating cycle of the group pulse generating circuit 21 with the start of each tenth operating cycle of the units pulse generating circuit 20, thereby to provide for exact coincidence between each group pulse generated and ten units pulses, a phase shift and drive circuit 44 is also embodied in the pulse generating equipment illustrated in Fig. 11 of the drawings. This circuit derives its excitation pulses from the eighth units pulse conductor 31h and responds to each excitation pulse by developing a triggering pulse for the group pulse generating circuit 21 in exact coincidence with the start of each units pulse on the first units pulse conductor 31a. The pulse generating equipment illustrated in Fig. 11 further comprises two start circuits 43 and 45 which are individually associated with the units pulse generating circuit 20 and the group pulse generating circuit 21. Each of these start circuits performs the function of reinitiating operation of the associated pulse generating circuit should the latter circuit stop generating pulses for any reason.

Drive circuit 46

Generally considered, this circuit, the details of which are illustrated in Fig. 14 of the drawings, is provided for the purpose of amplifying the low amplitude pulses delivered to the conductor 40 by the phase shift and pulse forming circuit 19 and of transmitting these pulses over the low impedance transmission line 47 to various components of the signaling system 9. Briefly, the circuit comprises an amplifier and inverter tube 1401, a high gain amplifier tube 1402 and a cathode follower tube 1403 connected in tandem in the order named between the output conductor 40 and the coaxial transmission line 47 extending to the signaling system 9. The tubes 1401, 1402 and 1403 are of the commercial 6C4, 6AK6 and 6AQ5 types, respectively. These tubes are coupled in a more or less conventional manner.

Referring to the operation of the drive circuit 46, positive pulses impressed on the conductor 40 by the phase shift and pulse forming circuit 19 are impressed upon the control grid of the tube 1401 through the coupling condenser 1404 and appear as amplified inverted pulses at the anode of this tube. In this connection, it is noted that the charge accumulated on the condenser 1404 as a result of the pulses transmitted therethrough serves to bias the tube 1401 beyond cutoff during off-pulse intervals. Further, the crystal diode 1405 functions to clamp the pulse base line at the ground potential level. The negative pulses appearing at the anode of the tube 1401 are impressed upon the control grid of the pentode amplifier 1402 through the coupling condenser 1406. Normally, the tube 1402 is heavily conductive due to the positive potential applied to the control grid thereof through the grid current limiting resistor 1407. However, each negative pulse impressed upon the control grid of the tube 1402 has the effect of biasing this tube beyond cutoff so that an amplified and inverted pulse, i. e., a pulse of positive polarity appears at the anode thereof. This positive pulse is impressed upon the control grid of the cathode follower tube 1403 through the coupling condenser 1409. Normally, the tube 1403 is biased by means of the negative potential applied to its control grid through the resistor 1410 to operate on the linear portion of its characteristic curve, so that each positive pulse applied to its control grid is reproduced without distortion across the cathode load impedance of the tube. This load impedance is illustrated as a resistor 47a, although it will be understood that in actual practice it comprises a number of parallel connected impedance elements embodied in the signaling system 9. In order to prevent width distortion of the pulses transmitted through the drive circuit 26, the output circuits of the two tubes 1401 and 1402 are respectively equipped with self-resonant inductance elements 1408 and 1411 each having a resonant frequency in the range of from four to five megacycles. Amplitude adjustment of the pulses developed across the cathode load impedance of the cathode follower tube 1403 is obtained by provided facilities comprising the potentiometer 1412 for adjustably varying the potential positively applied to the screen electrode of the tube 1402. Thus, by adjusting the position of the potentiometer arm 1412a along the potentiometer resistor, the screen potential of the tube 1402 may be changed to change the amplitude of the pulses positively reproduced at the anode of this tube.

*Pulse forming circuit 42*

As will be understood from the preceding explanation, the purpose of this circuit, the details of which are shown in Fig. 12, is to convert the sine wave output of the master oscillator 18 into sharp pulses occurring at a repetitive rate of one megacycle which are suitable for driving the units pulses generating circuit 20. In general, this component of the system is quite similar to one of the pulse forming channels embodied in the phase shift and pulse forming circuit 19. Thus the amplifier tube 1201, the pulse forming tube 1202 and the inverter tube 1203 respectively correspond to the tubes 406a, 502a and 503a of the pulse forming channel 500a. The cathode follower tube 1204, which is of the 6AQ5 type and is a high power tube, replaces the two parallel connected twin triode cathode follower tubes 504 and 505 of the circuit 19. All three of the tubes 1201, 1202 and 1203 are preferably pentodes of the 6AU6 type.

Referring to the operation of the pulse forming circuit 42, it will be apparent that the sine wave voltage developed at the output terminals of the master oscillator 18 is impressed between the cathode and control grid of the amplifier tube 1201 through the coupling condenser 1205 and after amplification through this tube is impressed upon the input electrodes of the pulse forming tube 1202 through the coupling condenser 1206. The magnitude of this voltage is sufficient completely to overload the pulse former tube 1202. More specifically, during each positive half cycle of the signal voltage appearing at the anode of the tube 1201, the grid-cathode path of the tube 1202 and the crystal rectifier 1207 both conduct, thus charging the coupling condenser 1206 to a value equal to the amplitude of the signal voltage. During each negative half cycle of this voltage, the tube 1202 is biased well beyond cutoff. In this manner, the signal voltage is clamped to the cathode potential of the tube 1202, resulting in an intermittent flow of plate current through this tube similar to that which occurs in a Class C amplifier.

During the positive half cycle of the signal voltage applied to the control grid of the tube 1202, current flow through the self-resonant inductance element 1210 is sharply increased. As a result, this element is shock excited to develop a transient wave train which oscillates at the natural resonant frequency of the element 1210, i. e., at a frequency of 2½ megacycles. The character of this wave train is such that during the first half thereof the upper terminal of the element 1210 is negative relative to the lower terminal of the element. Moreover, the shunting crystal rectifier 1209 is so poled as to be non-conductive during the first half cycle of the oscillatory transient developed across the element 1210. However, when the polarity of the voltage across the element 1210 reverses during the second half cycle of the oscillatory wave train, the crystal rectifier 1209 conducts to absorb all of the transient energy stored in the element 1210. Thus, only the first half cycle of the oscillatory transient as it appears at the top terminal of the element 1210 is permitted to endure. This voltage half cycle or pulse as it appears at the top terminal of the element 1210 is of negative polarity. Since the element 1210 is self-resonant at a frequency of 2½ megacycles, it will be understood that the first negative half cycle of each transient wave produced across this element persists for an interval of only one fifth of a microsecond. Thus as the signal voltage is continuously impressed upon the control grid of the tube 1202, pulses of negative polarity are developed at the anode of this tube which have a repetition rate of one megacycle, but in which the pulse persistence interval is limited to one fifth of a microsecond. The successive pulses are obviously spaced by an interval of four fifths of a microsecond.

The narrow negative pulses thus produced at the anode of the tube 1202 are impressed upon the control grid of the inverter tube 1203 through the coupling condenser 1208. This tube functions to amplify the pulses and invert the same so that they appear as positive pulses at the anode of this tube. In this regard, it is noted that the control grid of the tube 1203 is normally positively biased from the anode current supply source through the grid current limiting resistor 1211 to a value such that plate current flow through the inverter tube 1203 is at the saturation value. By thus normally biasing the tube 1203 to the plate current saturation point, the reference potential relative to which the pulses are repeated by the tube 1203 is positively clamped at a fixed level, with the result that variations in the pulse amplitude as a consequence of relatively slow changes in the reference voltage level are minimized.

The pulses of positive polarity developed at the anode of the inverter tube 1203 are repeated to the control grid of the cathode follower tube 1204 through the coupling condenser 1213. Normally, the tube 1204 is negatively biased to a fixed potential level through the grid resistor 1214. Accordingly, the positive pulses impressed upon the control grid of the cathode follower tube 1204 are amplified through this tube and appear as positive pulses across the cathode load resistor 1215. Due to the tremendous amplification obtained by employing a cathode follower tube 1204 of the 6AQ5 type, it is unnecessary when using the pulse forming circuit 42 to provide an additional cathode follower tube 1000 in the units pulse generating circuit 20 to repeat the pulses to the drive pulse bus conductor 1065. Accordingly, the narrow positive drive pulses developed across the cathode load resistor 1215 of the tube 1204 in the manner just described are repeated directly to the drive pulse conductor 1065 of the units pulse generating circuit 20 through the coupling condenser 1062.

*Starting circuits 43 and 45*

In general, the purpose of each of these circuits is to prepare the several stages of the associated ring circuits so that they will properly respond to the drive pulses applied to the ring circuits. More specifically and considering the start circuit 43 by way of example, this circuit performs the function of automatically restarting the units pulse generating circuit 20 in the event this circuit fails sequentially to produce units pulses on the conductor 31 in the manner explained above.

As shown in Fig. 12, the start circuit 43 is connected between the eighth units pulse conductor 31h and the bus over which negative bias potential is supplied to the control grids of each of the on-string tubes of the units pulse generating circuit 20. Briefly, the circuit 43 comprises a timing tube 1221 and a start tube 1222 connected in tandem in the order named. Preferably these tubes are of the gas filled commercial 5696 type. Interposed between the two tubes 1221 and 1222 is a timing network consisting of a condenser 1227 shunted by a resistor 1228. These two components operating in conjunction with the tube 1221 function generally as a relaxation oscillator.

More specifically to consider the operation of the circuit 43, it is pointed out that so long as positive units pulses are developed by the units pulse generating circuit 20, those pulses which appear on the eighth units pulse conductor 31b are impressed upon the control electrode of the timing tube 1221 through the condenser 1223. Each positive pulse thus applied to the control electrode of the tube 1221 effects ionization of the tube with the result that the condenser 1227 is charged from the negative current supply source through the space current path of the tube to drive the tube anode and the upper terminal of the condenser 1227 highly negative with respect to ground. When the condenser becomes nearly fully charged, the net voltage available to the tube 1221 becomes insufficient to maintain ionization of the tube with the result that the tube is extinguished. When this occurs, the condenser 1227 starts to discharge through the resistor 1228 at a rate determined by the time constant of the circuit. The described operation is repeated each time a positive pulse is delivered to the control electrode of the tube 1221 over the units pulse conductor 31h. It will be understood, therefore, that so long as positive pulses are delivered to the tube 1221 over the conductor 31h, this tube will be fired periodically and the condenser 1227 will remain charged to maintain the anode of the tube 1221 highly negative with respect to ground. In this regard, it is noted that the value of the resistor 1228 is relatively large, so that the condenser 1227 is prevented from discharging appreciably during the off-pulse periods when the tube 1221 is extinguished. If for any reason the units pulse generating circuit 20 should stop delivering pulses to the conductor 31h and thus arrest the transmission of pulses to the control electrode of the tube 1221 over the conductor 31h, the tube 1221 remains nonductive, permitting the condenser 1227 to discharge through the resistor 1228 and thus decrease the negative potential at the anode of the tube 1221. As shown, this negative potential is applied through the resistor 1229 to the control grid of the start tube 1222. Accordingly, when the potential on the anode of the tube 1221 drops to a sufficiently low value, the tube 1222 fires or becomes conductive to produce a heavy flow of current through its anode load resistor 1230. This current flow produces a voltage drop across the resistor 1230 which reduces the voltage across the tube 1222 below the extinction value to extinguish current flow through the tube and the resistor 1230. A large negative pulse is thus developed at the anode of the tube 1222 which is applied through the coupling condenser 1231 to the negative bias bus conductor for the control grids of the on-string tubes in the units pulse generating circuit 20. When this negative pulse is delivered to the control grids of the on-string tubes in the generating circuit 20, operation of this generating circuit is automatically restarted in a manner which will be fully apparent from the preceding explanation with reference to the operation of this pulse generating circuit. Upon the resumption of operation of the circuit 20, pulses, are, of course, again delivered to the control electrode of the tube 1221 over the pulse conductor 31h. As a consequence, periodic current flow through the tube 1221 is resumed to again build up a charge on the condenser 1227 which prevent this tube from re-ionizing.

From a comparison of the start circuits 43 and 45 respectively illustrated in Figs. 12 and 13 of the drawings, it will be apparent that the latter start circuit is identical with the start circuit 43 except that the large starting pulse which is delivered to the tens or group pulse generating circuit 21 in response to failure of this circuit to continue its operation is derived from a cathode load resistor 1341 in circuit with the start tube 1332 and hence is of positive polarity. This positive pulse which is applied to the negative bias bus conductor for the on-string tubes of the group pulse generating circuit 21 through the condenser 1342 has the effect of producing automatic restarting of the pulse generating circuit 21 by momentarily biasing all of the on-string tubes of this circuit to conduct and thus producing a transient condition in the pulse generating circuit which ultimately results in the restarting of the circuit. Aside from this small difference, the two start circuits 43 and 45 are identical.

*Phase shift and drive circuit 44*

As previously indicated, this circuit, the details of which are shown in Fig. 13, is excited by units pulses produced on the eighth units pulse conductor 31h by the units pulse generating circuit 20 and is provided for the purpose of delivering drive pulses to the group pulse generating circuit 21 to so control the latter circuit that each group or tens pulse developed thereby exactly spans or is coincident with one operating cycle of the units pulse generating circuit 20. In brief, the circuit 44 comprises a pulse forming tube 1301, a saw-tooth generator tube 1302, a phase control tube 1303 an amplifier or inverter tube 1304 and a cathode follower tube 1305 connected in tandem in the order named between the units pulse conductor 31h and the ring drive pulse conductor 1065 of the group pulse generating circuit 21. The two tubes 1301 and 1303 are pentodes of the commercial 6AK6 type, the two tubes 1302 and 1304 are pentodes of the commercial 6AU6 type and the cathode follower tube 1304 is a twin triode of the commercial 6J6 type. The circuit components employed to interconnect these tubes are described below in terms of the functions which they respectively perform in the circuit.

Referring now to the operation of the phase shift and drive circuit 44, it will be understood that the positive units pulses impressed upon the eighth units pulse conductor 31h are differentiated in the network including the condenser 1306 and the resistor 1307 and the differentiated waveform is applied to the control grid of the pulse forming tube 1301. Normally the tube 1301 is operating at zero bias so that the positive spike produced coincident with the leading edge of the units pulse by the network 1306, 1307 only serves to drive the control grid of the tube 1301 slightly positive and charge the condenser 1306. However, the negative spike produced coincident with the trailing edge of the units pulse by the circuit 1306, 1307 serves to cut off the tube 1301. The plate or anode load impedance of the tube 1301 comprises an inductance element 1308 which is self-resonant at a frequency of 2½ megacycles shunted by a crystal diode 1309 which is so poled that only positive pulses may be transmitted to the control grid of the saw-tooth generator tube 1302. More specifically, the pulse forming tube 1301 is rendered more heavily conductive at the start of each positive units pulse by the positive spike impressed upon the control grid thereof through the condenser 1306 thereby to provide a large current flow through the crystal rectifier 1309 and the space current path of the tube 1301. Due to the low impedance of the rectifier 1309, the resulting potential change at the anode of the tube 1301 is relatively small so that no negative pulse of any appreciable amplitude is repeated to the control grid of the saw-tooth generator tube 1302. However, the voltage developed across the rectifier 1309 is sufficient appreciably to excite the inductance element 1308 so that when the negative spike is applied to the control grid of the tube 1301, this inductance element starts to oscillate at its natural resonant frequency. The first half cycle of the transient voltage thus produced across the element 1308 is so poled that the lower terminal of this element is driven highly positive and hence cannot produce current flow through the shunting crystal rectifier 1309. This half cycle transient voltage is added to the 150 volts of the anode current supply source to produce a large positive pulse at the anode of the tube 1301. During the next half cycle of the oscillatory transient voltage produced across the inductance element 1308 as a result of self-oscillation of this element, the crystal rectifier 1309 is rendered conductive and due to its low internal resistance in the forward direction absorbs the remaining energy stored in the element 1308. Thus a very sharp positive pulse is produced at the anode of the tube 1301 coincident with the trailing edge of each units pulse applied to the control grid of the tube 1301. This sharp positive pulse endures for a period of one fifth microsecond due to the fact that the inductance element 1308 is tuned to resonate at a frequency of 2½ megacycles.

The sharp positive pulses produced at the anode of the tube 1301 in the manner just described are applied to the control grid of the saw-tooth generator tube 1302 through the coupling condenser 1310. Here also, grid conduction charging of the condenser 1310 occurs during each on-pulse period and discharging of this condenser through the grid resistor 1311 occurs after the positive pulse disappears. The tube 1302 is thus cut off for a short interval after each positive pulse applied to the control grid thereof as determined by the time constant of the condenser 1310 and resistor 1311. Each time one of the sharp positive pulses of high amplitude is supplied to the control grid of the tube 1302, this tube is rendered heavily conductive rapidly to charge the condenser 1335 from the negative 100 volt current supply source in a direction such that the upper terminal of the condenser is negative with respect to the zero bias potential level of the tube 1303. While the pulse endures, a large voltage is also produced across the anode load resistor 1312 of the tube 1302. When the pulse ends, the condenser 1335 starts to discharge through the resistor 1312 and the internal resistance of the positive anode current supply source and is then charged positively from this source, so that the potential at the upper terminal thereof gradually approaches the zero bias potential level of the tube 1303 and then goes positive relative to this potential level at a rate determined by the time constant of the circuit. This time constant is relatively long. The operations just described are repeated each time a positive units pulse is applied to the control grid of the tube 1302, so that a saw-tooth potential is developed at the upper terminal of the condenser 1334 which moves from a negative to a positive value with respect to the zero bias level of the tube 1303.

The saw-tooth voltage developed at the anode of the tube 1302 is impressed upon the control grid of the phase control tube 1303 through a circuit 1313 which includes a resistor 1333 shunted by a crystal diode 1334. Normally, the tube 1303 is cathode biased to the zero bias level through which the saw-tooth voltage developed at the anode of the tube 1312 rises from a negative value to a positive value by means of a cathode bleeder circuit which comprises a resistor 1314 and an adjustable potentiometer 1315. When the applied saw-tooth voltage rises to the zero bias level, grid current starts to flow in the tube 1303. However, the crystal diode 1334 is so poled as to limit the magnitude of grid current flow in the tube 1303. As shown, the anode load circuit of the tube 1303 comprises an inductance element 1319 which is self-resonant at a frequency of 2½ megacycles shunted by a crystal diode 1318 so poled as to suppress positive potential impulses which tend to be produced at the anode of the tube 1303.

With the described arrangement, no anode current flows through the tube 1303 at the start of each saw-tooth pulse applied to the control grid of this tube, due to the fact that the tube is biased beyond cutoff from the anode of the tube 1302. As the saw-tooth pulse rises toward the zero bias level of the tube 1303 and passes through the cutoff bias level of this tube, anode current starts to flow in the tube. This current will, of course, rise as the saw-tooth voltage applied to the control grid of the tube rises towards the zero bias level, but due to the high gain of the tube very little grid voltage rise is required before grid current flow starts in the tube and as explained above such grid current flow is limited by the crystal diode 1322.

From the above explanation it will be understood that abrupt changes occur in anode current flow through the tube 1303 at two points after the leading edge of the saw-tooth pulse is applied to the control grid of this tube. Thus, the anode current flow through the tube 1303 changes abruptly from zero to a finite value at the instant the saw-tooth voltage pulse exceeds the cutoff value of the tube to render the tube conductive and later again changes abruptly when the saw-tooth voltage pulse rise to the zero bias level of the tube 1303 to render the crystal diode 1334 non-conductive. Both of these abrupt changes tend to produce self-oscillation of the inductance element 1319. However, the first half cycle of the oscillatory voltage developed across this element as the bias on the control grid of the tube 1303 rises through the cutoff level to render the tube conductive is so poled as to render the crystal diode 1318 conductive, so that the entire transient is suppressed and no appreciable potential change is produced at the anode of the tube 1303. On the other hand, the first half cycle of the oscillatory voltage developed across the inductance element 1319 in response to the abrupt change in anode current flow through the tube 1303 which occurs when the voltage applied to the control grid of this tube reaches the zero bias level, is not so poled as to produce current conduction through the crystal diode 1318 and hence is reproduced as a large negative pulse at the anode of the tube 1303. The second half cycle of the oscillatory voltage developed across the inductance element 1319 is, of course, so poled as to produce current flow through the rectifier 1318, thereby to dissipate the energy stored in the element 1319.

From the above description, it will be apparent that a large negative pulse is produced at the anode of the tube 1303 coincident with the point on each saw-tooth voltage pulse applied to the control grid of this tube at which the saw-tooth voltage reaches the zero bias level of the tube. This point occurs several microseconds following the trailing edge of each saw-tooth voltage pulse, so that each negative pulse produced at the anode of the tube 1303 is phase shifted or delayed by several microseconds with respect to the trailing edge of the corresponding units pulse applied to the control grid of the pulse forming tube 1301. Moreover, by shifting the potentiometer arm 1315a along the potentiometer resistor 1315 to change the zero bias level of the tube 1303, the magnitude of the described delay or phase shift may obviously be adjusted, within limits, as desired.

The sharp negative pulses produced at the anode of the tube 1303 in the manner just explained are impressed upon the control grid of the amplifier and inverter tube 1304 through a coupling condenser 1320 and a clipping circuit 1321 which comprises a high resistance resistor 1323 shunted by a crystal diode 1322. The circuit 1321 is provided to suppress any small positive pulses developed on the anode of the tube 1303 which are not completely suppressed through operation of the crystal diode 1318 in the manner explained above. Normally, the amplifier and inverter tube 1304 is conducting at the anode current saturation level due to the application of a positive bias voltage to the control grid of this tube through the grid current limiting resistor 1324. However, the negative pulses applied to the control grid of this tube from the anode of the tube 1303 drive the tube 1304 beyond cutoff to produce large positive pulses at the anode of the tube 1304. Width distortion of these pulses is prevented through the provision of an inductance element 1326 in the anode circuit of the tube 1304 which is self-resonant at a frequency of from four to five megacycles. It will be understood that since the tube 1304 is driven from anode current saturation to cutoff in response to each negative pulse applied to its control grid, the positive pulses produced at the anode of this tube are of uniform amplitude regardless of variations in the amplitude of the driving pulses.

The positive pulses developed at the anode of the tube 1304 are applied to the two control grids of the cathode follower tube 1305 through a coupling circuit which comprises the coupling condenser 1327 and grid resistor 1328. Thus, the pulses are reproduced positively at the cathode end of the cathode load resistor 1329. These pulses are impressed directly upon the drive pulse bus 1065 of the group pulse generating circuit 21 through a coupling condenser 1062. In this connection it may be pointed out that the tube 1305 performs the function of the tube 1000 in the ring circuit 20.

As will be apparent from the above explanation, the drive pulses delivered to the bus conductor 1065 through the condenser 1062 from the load resistor 1329 of the cathode follower tube 1325 are delayed relative to the trailing edges of the units pulses impressed upon the eight units pulse conductor 31h by the units pulse generating circuit 20. Moreover, the extent or magnitude of the delay may be varied within limits as desired through adjustment of the potentiometer arm 1315a along the potentiometer resistor 1315. In the normal operation of the equipment, this potentiometer is so adjusted that the leading edge of each group pulse produced by the group pulse generating circuit 21 is in exact coincidence with the leading edge of the first units pulse produced by the units pulse generating circuit 20 during each operating cycle of the latter and the trailing edge of each group pulse exactly concides with the trailing edge of the tenth units pulse produced during each operating cycle of the units pulse generating circuit 20.

While the invention has been described with particular reference to two embodiments thereof, it will be understood that various modifications may be made therein which are within the true spirit and scope of the appended claims.

What is claimed as new and is desired to be secured by Letters Patent of the United States is:

1. Pulse generating apparatus for controlling the signal channel separating components of a signaling system of the time sharing type, comprising means for developing first and second trains of periodically recurring drive pulses, the pulses in said first and second trains having the same fixed repetition rate and each pulse in said first train being displaced in phase relative to the corresponding pulse in said second train, a cyclically operative pulse generating circuit provided with a plurality of output channels and including means responsive to the drive pulses in one of said trains for releasing non-overlapping pulses of greater width than said drive pulses sucecssively to said output channels, and a channel pulse commutator provided with a plurality of channel pulse output paths and including means responsive to the pulses released to said output channels for commutating the pulses of the other drive pulse train successively to said channel pulse output paths.

2. Pulse generating apparatus for controlling the signal channel separating components of a signaling system of the time sharing type, comprising means for developing two trains of drive pulses having the same recurrence rate, a cyclically operative pulse generating circuit provided with a plurality of output channels and including means responsive to the drive pulses in one of said trains for releasing non-overlapping pulses of greater width than said drive pulses successively to said output channels, a channel pulse commutator provided with a plurality of channel pulse output paths and including means responsive to the pulses released to said output channels for commutating the pulses of the other drive pulse train successively to said channel pulse output paths, and means for so phase displacing the pulses of said two drive pulse trains that the pulses commutated to said channel pulse output paths are entirely overlapped by the pulses released to said output channels.

3. Pulse generating apparatus for controlling the signal channel separating components of a signaling system of the time sharing type, comprising an oscillator, a phase shift and pulse forming circuit for converting the output signal of said oscillator into two trains of phase displaced drive pulses of the same frequency, a cyclically operative units pulse generating circuit provided with a plurality of output channels and including means responsive to the drive pulses in one of said trains for releasing units pulses of greater width than said drive pulses successively to said output channels, a cyclically operative group pulses generating circuit provided with a plurality of group pulse output channels and including means responsive to a predetermined one of the units pulses developed during each operating cycle of said units pulse generating circuit for releasing group pulses successively to said group pulse output channels at the rate of one group pulse for each operating cycle of said units pulse generating circuit, and a channel pulse commutator provided with a plurality of channel pulse output paths and including means responsive to said units pulses for commutating the drive pulses of the other of said drive pulse trains successively to said channel pulse output paths.

4. Pulse generating apparatus for controlling the signal channel separating components of a signaling system of the time sharing type, comprising an oscillator, a pulse forming circuit for converting the output signal of said oscillator into two trains of drive pulses of the same frequency, a cyclically operative units pulse generating circuit provided with a plurality of units pulse output channels and including means responsive to the drive pulses in one of said trains for releasing units pulses of greater width than said drive pulses successively to said units pulse output channels, the units pulses successively released to said units pulse output channels individually occurring during different non-overlapping time positions which recur in repetitive time position frames, a cyclically operative group pulse generating circuit provided with a plurality of group pulse output channels and including means responsive to a predetermined one of the units pulses developed during each operating cycle of said units pulse generating circuit for releasing pulses successively to said group pulse output channels at the rate of one group pulse for each operating cycle of said units pulse generating circuit, a channel pulse commutator provided with a plurality of channel pulse output paths and including means responsive to said units pulses for commutating the drive pulses of the other drive pulse train successively to said channel pulse output paths, and means included in said pulse forming circuit for so phase displacing the pulses of said two trains that the pulses commutated to said channel pulse output channels are entirely overlapped by the pulses released to said units pulse output channels.

5. Pulse generating apparatus for controlling the signal channel separating components of a signaling system of the time sharing type, comprising an oscillator, a phase shift and pulse forming circuit for converting the output signal of said oscillator into two trains of phase displaced drive pulses of the same frequency, a cyclically operative units pulse generating circuit provided with a plurality of output channels and including means responsive to the drive pulses in one of said trains for releasing non-overlapping units pulses of greater width than said drive pulses successively to said output channels, and a channel pulse commutator provided with a plurality of channel pulse output paths and including means responsive to said units pulses for commutating the drive pulses of the other of said drive pulse trains successively to said channel pulse output paths.

6. Pulse generating apparatus for controlling the signal channel separating components of a signaling system of the time sharing type, comprising an oscillator, a pulse forming circuit for converting the output signal of said oscillator into two trains of drive pulses of the same frequency, a cyclically operative units pulse generating circuit provided with a plurality of units pulse output channels and including means responsive to the drive pulses in one of said trains for releasing units pulses of greater width than said drive pulses successively to said units pulse output channels, the units pulses successively released to said units pulse output channels individually occurring during different non-overlapping time positions which recur in repetitive time position frames, a channel pulse commutator provided with a plurality of channel pulse output paths and including means responsive to said units pulses for commutating the drive pulses of the other drive pulse train successively to said channel pulse output paths, and means included in said pulse forming circuit for so phase displacing the pulses of said two trains that the pulses commutated to said channel pulse output channels are entirely overlapped by the pulses released to said units pulse output channels.

7. Pulse generating apparatus for controlling the signal channel separating components of a signaling system of the time sharing type, comprising means for developing two trains of phase displaced pulses of the same frequency, a cyclically operative pulse generating circuit provided with a plurality of output channels and including means responsive to the drive pulses in one of said trains for releasing non-overlapping pulses of greater width than said drive pulses successively to said output channels, a channel pulse commutator provided with a plurality of channel pulse output paths and including a plurality of pulse gating tubes for gating the drive pulses of the other of said drive pulse trains successively to said output paths and each provided with first and second control electrodes, means for commonly exciting said first control electrodes of said tubes with said drive pulses of said other drive pulse train, and means for successively exciting said second control electrodes of said tubes with the pulses successively released to said output channels, thereby successively to gate the drive pulses of said other drive pulse train to said output paths.

8. Pulse generating apparatus for controlling the signal channel separating components of a signaling system of the time sharing type, comprising an oscillator, a pulse forming circuit for converting the output signal of said oscillator into two trains of drive pulses of the same frequency, a cyclically operative units pulse generating circuit provided with a plurality of units pulse output channels and including means responsive to the drive pulses in one of said trains for releasing non-overlapping units pulses of greater width than said drive pulses successively to said units pulse output channels, a cyclically operative group pulse generating circuit provided with a plurality of group pulse output channels and including means responsive to a predetermined one of the units pulses developed during each operating cycle of said units pulse generating circuit for releasing non-overlapping group pulses successively to said group pulse output channels at the rate of one group pulse for each operating cycle of said units pulse generating circuit, a channel pulse commutator provided with a plurality of channel pulse output paths and including a plurality of pulse gating tubes for gating the drive pulses of the other of said drive pulse trains successively to said output paths and each provided with first and second control electrodes, means for commonly exciting the first control electrodes of said tubes with said drive pulses of said other drive pulse train, means for successively exciting the second control electrodes of said tubes with the units pulses successively released to said units pulse output channels, thereby successively to gate the drive pulses of said other drive pulse train to said output paths, and means for so phase displacing the pulses of said two drive pulse trains that the pulses gated to said output paths are entirely overlapped by the pulses released to said units pulse output channels.

9. Pulse generating apparatus for controlling the signal channel separating components of a signaling system of the time sharing type, comprising an oscillator, a pulse forming circuit for converting the output signal of said oscillator into two trains of drive pulses of the same frequency, a cyclically operative units pulse generating circuit provided with a plurality of units pulse output channels and including means responsive to the drive pulses in one of said trains for releasing non-overlapping units pulses of greater width than said drive pulses successively to said units pulse output channels, a cyclically operative group pulse generating circuit provided with a plurality of group pulse output channels and including means responsive to a predetermined one of the units pulses developed during each operating cycle of said units pulse generating circuit for releasing non-overlapping group pulses successively to said group pulse output channels at the rate of one group pulse for each operating cycle of said units pulse generating circuit, a channel pulse commutator provided with a plurality of channel pulse output paths and including a plurality of pulse gating tubes for gating the drive pulses of the other of said drive pulse trains successively to said output paths and each provided with a control grid and a suppressor grid, means for commonly exciting the control grids of said tubes with said drive pulses of said other drive pulse train, means for successively exciting the suppressor grids of said tubes with the units pulses successively released to said units pulse output channels, thereby successively to gate the drive pulses of said other drive pulse train to said output paths, and means for so phase displacing the pulses of said two drive pulse trains that the pulses gated to said output paths are entirely overlapped by the pulses released to said units pulse output channels.

10. Pulse generating apparatus for controlling the signal channel separating components of a signaling system of the time sharing type, comprising means for developing three trains of control pulses of the same frequency, a drive circuit operative to develop drive pulses in response to the control pulses of one of said trains, a cyclically operative pulse generating circuit provided with a plurality of output channels and including means responsive to the control pulses in a second of said pulse trains for releasing pulses of greater width than said control pulses successively to said output channels, a channel pulse commutator provided with a plurality of channel pulse output paths and including means responsive to the pulses released to said output channels for commutating the control pulses of the third control pulse train successively to said output paths, and adjustable phase changing means for shifting the phase of the pulses of said one and said third control pulse trains relative to each other and relative to the pulses of said second control pulse train, thereby to establish a desired time relationship between the occurrence of said drive pulses, the pulses released to said output channels and the pulses commutated to said output paths.

11. Pulse generating apparatus for controlling the signal channel separating components of a signaling system of the time sharing type, comprising means for developing three trains of control pulses of the same frequency, a drive circuit operative to develop drive pulses in response to the control pulses of one of said trains, a cyclically operative units pulse generating circuit provided with a plurality of units pulse output channels and including means responsive to the control pulses of a second of said pulse trains for releasing pulses of greater width than said control pulses successively to said output channels, a cyclically operative group pulse generating circuit provided with a plurality of group pulse output channels and including means responsive to a predetermined one of the units pulses developed during each operating cycle of said units pulse generating circuit for releasing group pulses successively to said group pulse output channels at the rate of one group pulse for each operating cycle of said units pulse generating circuit, a channel pulse commutator provided with a plurality of channel pulse output paths and including means responsive to the units pulses released to said units pulse output channels for commutating the control pulses of the third train of control pulses successively to said output paths, and adjustable phase changing means for shifting the phase of the control pulses of said trains relative to each other, thereby to establish a desired time relationship between the occurrence of said drive pulses, the pulses released to said units pulse output channels and the pulses commutated to said output paths.

12. Pulse generating apparatus for controlling the signal channel separating components of a signaling system of the time sharing type, comprising means for developing three trains of control pulses, a drive circuit operative to develop drive pulses in response to the control pulses of one of said trains, a cyclically operative units pulse generating circuit provided with a plurality of units pulse output channels and including means responsive to the control pulses of a second of said pulse trains for releasing pulses of greater width than said control pulses successively to said output channels, a cyclically operative group pulse generating circuit provided with a plurality of group pulse output channels, a purse transmission channel for transmitting units pulses released to a predetermined one of said units pulse output channels to said group pulse generating circuit, means included in said group pulse generating circuit responsive to the units pulses transmitted thereto over said transmission channel for releasing group pulses successively to said group pulse output channels at the rate of one group pulse for each operating cycle of said units pulse generating circuit, adjustable means included in said pulse transmission channel for estalishing a predetermined time relationship between the leading edge of each group pulse and the leading edge of one of said units pulses, a channel pulse commutator provided with a plurality of channel pulse output paths and including means responsive to the units pulses released to said units pulse output channels for commutating the control pulses of the third train of control pulses successively to said output paths, and adjustable phase changing means for shifting the phase of the control pulses of said trains relative to each other, thereby to establish a desired time relationship between the occurrence of said drive pulses, the pulses released to said units pulse output channels and the pulses commutated to said output paths.

13. Pulse generating apparatus for controlling the signal channel separating components of a signalling system of the time sharing type, comprising means for developing three trains of control pulses of the same frequency, a drive circuit operative to develop drive pulses in response to the control pulses of one of said trains, a cyclically operative units pulse generating ring circuit provided with a plurality of output channels and including units pulse generating stages successively responsive to the control pulses in a second of said control pulse trains for releasing units pulses of greater width than said control pulses successively to said output channels, means controlled by the units pulses released to one of said units pulse output channels and responsive to stoppage of said ring circuit for automatically restarting said ring circuit, a cyclically operative group pulse generating ring circuit provided with a plurality of group pulse output channels, a transmission channel for transmitting units pulses released to a predetermined one of said units pulse output channels to said group pulse generating ring circuit, a plurality of group pulse generating stages included in said group pulse generating ring circuit responsive to the units pulses transmitted thereto over said transmission channel for releasing group pulses successively to said group pulse output channels at the rate of one group pulse for each operating cycle of said units pulse generating circuit, adjustable means included in said pulse transmission channel for establishing a predetermined time relationship between the leading edge of each group pulse and the leading edge of one of said units pulses, a channel pulse commutator provided with a plurality of channel pulse output paths and including means responsive to the units pulses released to said units pulse output channels for commutating the control pulses of the third train of control pulses successively to said output paths, and adjustable phase changing means for shifting the phase of the control pulses of said trains relative to each other, thereby to establish a desired time relationship between the occurrence of said drive pulses, the pulses released to said units pulse output channels and the pulses commutated to said output paths.

14. Pulse generating apparatus for controlling the signal channel separating components of a signaling system of the time sharing type, comprising a cyclically operative units pulse generating circuit provided with a plurality of output channels and including means for releasing units pulses successively to said units pulse output channels, a cyclically operative group pulse generating circuit provided with a plurality of group pulse output channels, a pulse transmission channel for transmitting units pulses released to a predetermined one of said units pulse output channels to said group pulse generating circuit, means included in said group pulse generating circuit responsive to the units pulses transmitted thereto over said transmission channel for releasing pulses successively to said group pulse output channels, and adjustable means included in said pulse transmission channel for establishing a predetermined time relationship between each group pulse and said unit pulses.

15. Pulse generating apparatus for controlling the signal channel separating components of a signaling system of the time sharing type, comprising a cyclically operative units pulse generating circuit provided with a plurality of output channels and including means for releasing units pulses successively to said units pulse output channels, a cyclically operative group pulse generating circuit provided with a plurality of group pulse output channels, a pulse transmission channel for transmitting units pulses released to a predetermined one of said units pulse output channels to said group pulse generating circuit, means included in said group pulse generating circuit responsive to the units pulses transmitted thereto over said transmission channel for releasing pulses successively to said group pulse output channels, and pulse delay means included in said transmission channel for delaying the units pulses transmitted to said group pulse generating circuit to establish time coincidence between the leading edge of each group pulse and the leading edge of a particular one of the units pulses released to said units pulse output channels during each operating cycle of said units pulse generating circuit.

16. Pulse generating apparatus for controlling the signal channel separating components of a signaling system of the time sharing type, comprising a cyclically operative units pulse generating circuit provided with a plurality of output channels and including means for releasing units pulses successively to said units pulse output channels, a cyclically operative group pulse generating circuit provided with a plurality of group pulse output channels, a pulse transmission channel for transmitting units pulses released to a predetermined one of said units pulse output channels to said group pulse generating circuit, means included in said group pulse generating circuit responsive to the units pulses transmitted thereto over said transmission channel for releasing pulses successively to said group pulse output channels, each of said group pulses having a time duration exactly equaling the period occupied by the units pulses generated during one operating cycle of said units pulse generating circuit, and adjustable pulse delay means included in said transmission channel for delaying the units pulses transmitted to said group pulse generating circuit to establish time coincidence between the leading edge of each group pulse and the leading edge of the first units pulse released to said units pulse output channels during each operating cycle of said units pulse generating circuit.

17. Pulse generating apparatus for controlling the signal channel separating components of a signaling system of the time sharing type, comprising a cyclically operative units pulse generating circuit provided with ten output channels and including means for successively releasing one units pulse to each output channel during each operating cycle of said circuit, a cyclically operative group pulse generating circuit provided with a plurality of group pulse output channels, a pulse transmission channel for transmitting to said group pulse generating circuit units pulses released to a predetermined one of said units pulse output channels at an intermediate point in each operating cycle of said units pulse generating circuit, means included in said group pulse generating circuit responsive to the units pulses transmitted thereto over said transmission channel for releasing group pulses successively to said group pulse output channels at the rate of one group pulse for each operating cycle of said units pulse generating circuit, each of said group pulses having a time duration exactly equaling the period occupied by the ten units pulses generated during each operating cycle of said units pulse generating circuit, and adjustable pulse delay means included in said transmission channel for delaying the units pulses transmitted to said group pulse generating circuit to establish time coincidence between the leading edge of each group pulse and the leading edge of the first units pulse released by said units pulse generating circuit during each operating cycle of said units pulse generating circuit.

References Cited in the file of this patent
UNITED STATES PATENTS

| | | |
|---|---|---|
| 2,414,477 | Mecham | Jan. 21, 1947 |
| 2,516,888 | Levy | Aug. 1, 1950 |
| 2,560,600 | Schafer | July 17, 1951 |